United States Patent
Karabinis

(10) Patent No.: US 7,603,117 B2
(45) Date of Patent: Oct. 13, 2009

(54) SYSTEMS AND METHODS FOR TERRESTRIAL USE OF CELLULAR SATELLITE FREQUENCY SPECTRUM

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 717 days.

(21) Appl. No.: 11/147,048

(22) Filed: Jun. 7, 2005

(65) Prior Publication Data
US 2005/0282542 A1 Dec. 22, 2005

Related U.S. Application Data

(63) Continuation of application No. 10/225,616, filed on Aug. 22, 2002, now Pat. No. 7,031,702, and a continuation-in-part of application No. 10/074,097, filed on Feb. 12, 2002, now Pat. No. 6,684,057, and a continuation-in-part of application No. 10/156,363, filed on May 28, 2002, now Pat. No. 7,039,400.

(60) Provisional application No. 60/322,240, filed on Sep. 14, 2001, provisional application No. 60/347,174, filed on Jan. 9, 2002, provisional application No. 60/392,754, filed on Jul. 1, 2002.

(51) Int. Cl.
*H04Q 7/20* (2006.01)
(52) U.S. Cl. .............. 455/427; 455/428; 455/429; 455/63.1; 455/11.1; 455/12.1; 455/13.1
(58) Field of Classification Search ............. 455/427, 455/524, 12.1, 13.1, 63.1, 522, 11.1, 428, 455/429; 370/321
See application file for complete search history.

(56) References Cited

U.S. PATENT DOCUMENTS

| | | | |
|---|---|---|---|
| 4,287,588 A | * | 9/1981 | Segner ................... 370/280 |
| 4,901,307 A | | 2/1990 | Gilhousen et al. |
| 5,073,900 A | | 12/1991 | Mallinckrodt |
| 5,303,286 A | | 4/1994 | Wiedeman |
| 5,339,330 A | | 8/1994 | Mallinckrodt |

(Continued)

FOREIGN PATENT DOCUMENTS

EP 0 506 255 A2 9/1992

(Continued)

OTHER PUBLICATIONS

Supplementary European Search Report, EP 02766068.7, Oct. 24, 2007.

(Continued)

*Primary Examiner*—David Q Nguyen
(74) *Attorney, Agent, or Firm*—Myers Bigel Sibley & Sajovec, P.A.

(57) ABSTRACT

A satellite radiotelephone system includes a space-based component that is configured to receive wireless communications from radiotelephones over a range of satellite band return link frequencies and to transmit wireless communications to radiotelephones over a range of satellite band forward link frequencies. An ancillary terrestrial component is configured to receive wireless communications from radiotelephones over the range of satellite band return link frequencies, and to transmit wireless communications to radiotelephones over the range of satellite band forward link frequencies.

12 Claims, 14 Drawing Sheets

U.S. PATENT DOCUMENTS

| | | | |
|---|---|---|---|
| 5,394,561 A * | 2/1995 | Freeburg | 455/428 |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,734,678 A | 3/1998 | Paneth et al. | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,148,176 A | 11/2000 | Kolev et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,950,625 B2 * | 9/2005 | Regulinski et al. | 455/13.1 |
| 6,975,837 B1 | 12/2005 | Santoru | |
| 6,999,720 B2 | 2/2006 | Karabinis | |
| 7,006,789 B2 | 2/2006 | Karabinis et al. | |
| 2001/0031015 A1 | 10/2001 | West et al. | |
| 2002/0090942 A1 | 7/2002 | Karabinis et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2003/0224785 A1 | 12/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 99/10994 A1 | 3/1999 |
| WO | WO 01/54314 A1 | 7/2001 |

OTHER PUBLICATIONS

International Search Report, PCT/US02/24774, Dec. 10, 2002.
International Search Report, PCT/US02/26849, Mar. 28, 2003.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept" *Wireless Networks*, Vo. 4, 1998, pp. 189-198.

Supplementary European Search Report, EP 02 76 8424, Sep. 3, 2008.

* cited by examiner

SYSTEMS AND METHODS FOR TERRESTRIAL USE OF CELLULAR SATELLITE FREQUENCY SPECTRUM

CROSS-REFERENCE TO RELATED APPLICATIONS

This application is a continuation of application Ser. No. 10/225,616, filed Aug. 22, 2002, now U.S. Pat. No. 7,031,702 entitled Additional Systems and Methods for Monitoring Terrestrially Reused Satellite Frequencies to Reduce Potential Interference, which itself claims the benefit of provisional Application No. 60/322,240, filed Sep. 14, 2001, entitled Systems and Methods for Terrestrial Re-Use of Mobile Satellite Spectrum, provisional Application Ser. No. 60/347,174, filed Jan. 9, 2002, entitled Monitoring Terrestrially Reused Satellite Frequencies to Reduce Potential Interference, and provisional Application Ser. No. 60/392,754, filed Jul. 1, 2002, entitled Additional Systems and Methods for Monitoring Terrestrially Reused Satellite Frequencies to Reduce Potential Interference. Application Ser. No. 10/225,616 is a continuation-in-part of application Ser. No. 10/074,097, filed Feb. 12, 2002 (now U.S. Pat. No. 6,684,057) entitled Systems and Methods for Terrestrial Reuse of Cellular Satellite Frequency Spectrum and is also a continuation-in-part of application Ser. No. 10/156,363, filed May 28, 2002, now U.S. Pat. No. 7,039,400 entitled Systems and Methods for Monitoring Terrestrially Reused Satellite Frequencies to Reduce Potential Interference. Application Ser. No. 10/156,363 itself claims the benefit of provisional Application Ser. No. 60/347,174, filed Jan. 9, 2002, entitled Monitoring Terrestrially Reused Satellite Frequencies to Reduce Potential Interference; and itself is a continuation-in-part of application Ser. No. 10/074,097, filed Feb. 12, 2002 (now U.S. Pat. No. 6,684,057), entitled Systems and Methods for Terrestrial Reuse of Cellular Satellite Frequency Spectrum, which claims the benefit of provisional Application No. 60/322,240, filed Sep. 14, 2001, entitled Systems and Methods for Terrestrial Re-Use of Mobile Satellite Spectrum. All of these applications are assigned to the assignee of the present application, the disclosures of all of which are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

As is well known to those having skill in the art, terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Some embodiments of the present invention provide systems and methods for terrestrial use of cellular satellite frequency spectrum. More specifically, according to some embodiments of the present invention, a satellite radiotelephone system comprises a space-based component that is configured to receive wireless communications from radiotelephones over a range of satellite band return link frequencies and to transmit wireless communications to radiotelephones over a range of satellite band forward link frequencies. An ancillary terrestrial component is configured to receive wireless communications from radiotelephones over the range of satellite band return link frequencies and to transmit wireless communications to radiotelephones over the range of satellite band forward link frequencies.

In other embodiments of the present invention, the ancillary terrestrial component is configured to transmit wireless communications to radiotelephones and to receive wireless communications from radiotelephones over a range of satellite band return link frequencies. In still other embodiments of the invention, the ancillary terrestrial component is configured to receive wireless communications from radiotelephones over a range of satellite band return link frequencies and to transmit wireless communications to radiotelephones over a range of satellite band forward link frequencies. In still other embodiments of the present invention, the ancillary terrestrial component is configured to transmit wireless communications to radiotelephones and to receive wireless communications from radiotelephones over a range of satellite band return link frequencies. In all of the above-described embodiments, the radiotelephones may be located where a satellite footprint of the space-based component and a cell of the ancillary terrestrial component overlap.

It will be understood by those having skill in the art that embodiments of the present invention have been described above primarily in connection with satellite radiotelephone systems. However, other embodiments of the present invention provide ancillary terrestrial components for satellite radiotelephone systems, the radiotelephones themselves and analogous methods of operating a satellite radiotelephone system, an ancillary terrestrial network and/or a radiotelephone.

Finally, radiotelephones and operating methods according to other embodiments of the present invention include an electronics system that is configured to transmit wireless communications to the ancillary terrestrial component over a range of satellite band forward link frequencies, wherein a radiotelephone output is gated to cease transmissions periodically over a period of time. The electronics system may be configured to transmit the wireless communications using a Code Division Multiple Access (CDMA) air interface. Analogous methods also may be provided.

DETAILED DESCRIPTION

The present invention now will be described more fully hereinafter with reference to the accompanying drawings, in which embodiments of the invention are shown. This invention, however, should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
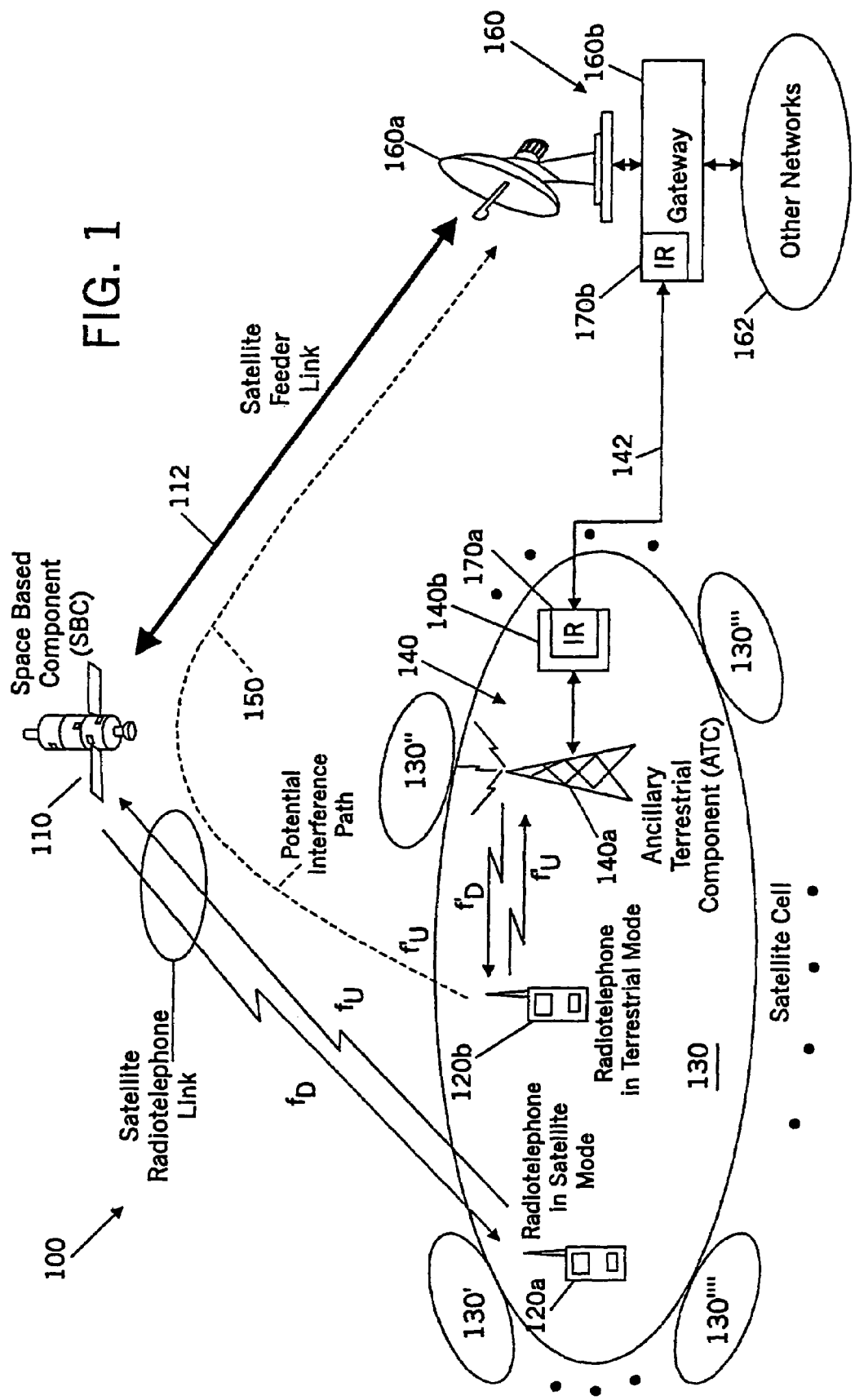
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120*b* in a satellite footprint comprising one or more satellite radiotelephone cells 130-130"" over one or more satellite radiotelephone forward link (downlink) frequencies $f_D$. The space-based component 110 is configured to receive wireless communications from, for example, a first radiotelephone 120*a* in the satellite radiotelephone cell 130 over a satellite radiotelephone return link (uplink) frequency $f_U$. An ancillary terrestrial network, comprising at least one ancillary terrestrial component 140, which may include an antenna 140*a* and an electronics system 140*b* (for example, at least one antenna 140*a* and at last one electronics system 140*b*), is configured to receive wireless communications from, for example, a second radiotelephone 120*b* in the radiotelephone cell 130 over the satellite radiotelephone uplink frequency, denoted $f'_U$, which may be the same as $f_U$. Thus, as illustrated in FIG. 1, radiotelephone 120*a* may be communicating with the space-based component 110 while radiotelephone 120*b* may be communicating with the ancillary terrestrial component 140. As shown in FIG. 1, the space-based component 110 also undesirably receives the wireless communications from the second radiotelephone 120*b* in the satellite radiotelephone cell 130 over the satellite radiotelephone frequency $f'_U$ as interference. More specifically, a potential interference path is shown at 150. In this potential interference path, the return link signal of the second radiotelephone 120*b* at carrier frequency $f'_U$ interferes with satellite communications. This interference would generally be strongest when $f'_U = f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160*a* and an electronics system 160*b* that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170*a* also may be provided at least partially in the ancillary terrestrial component electronics system 140*b*. Alternatively or additionally, an interference reducer 170*b* may be provided at least partially in the gateway electronics system 160*b*. In yet other alternatives, the interference reducer may be provided at least partially in other components of the cellular satellite system/method 100 instead of or in addition to the interference reducer 170*a* and/or 170*b*. The interference reducer is responsive to the space-based component 110 and to the ancillary terrestrial component 140, and is configured to reduce the interference from the wireless communications that are received by the space-based component 110 and is at least partially generated by the second radiotelephone 120*b* in the satellite radiotelephone cell 130 over the satellite radiotelephone frequency $f'_U$. The interference reducer 170*a* and/or 170*b* uses the wireless communications $f'_U$ that are intended for the ancillary terrestrial component 140 from the second radiotelephone 120*b* in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120*a* and 120*b*, respectively, than is the space-based component 110, such that the wireless communications from the second radiotelephone 120*b* are received by the ancillary terrestrial component 140 prior to being received by the space-based component 110. The interference reducer 170*a* and/or 170*b* is configured to generate an interference cancellation signal comprising, for example, at least one delayed replica of the wireless communications from the second radiotelephone 120*b* that are received by the ancillary terrestrial component 140, and to subtract the delayed replica of the wireless communications from the second radiotelephone 120*b* that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120*b* at $f'_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160*b* can be at least partially canceled. Thus, as shown in FIG. 1, an interference cancellation signal, such as the demodulated ancillary terrestrial component signal, can be sent to the satellite gateway 160*b* by the interference reducer 170*a* in the ancillary terrestrial component 140, for example using link 142. In the interference reducer 170*b* at the gateway 160*b*, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f'_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
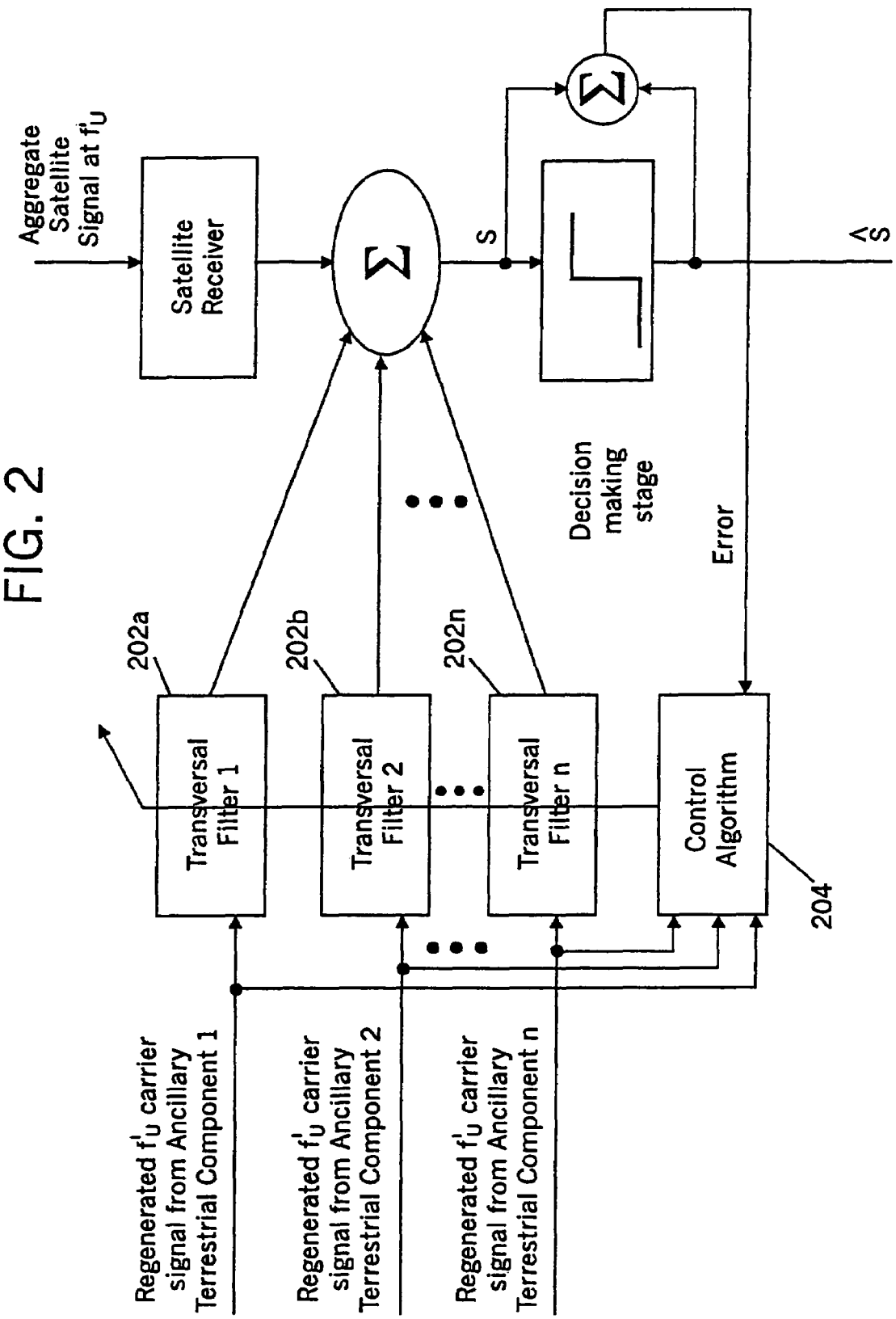
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
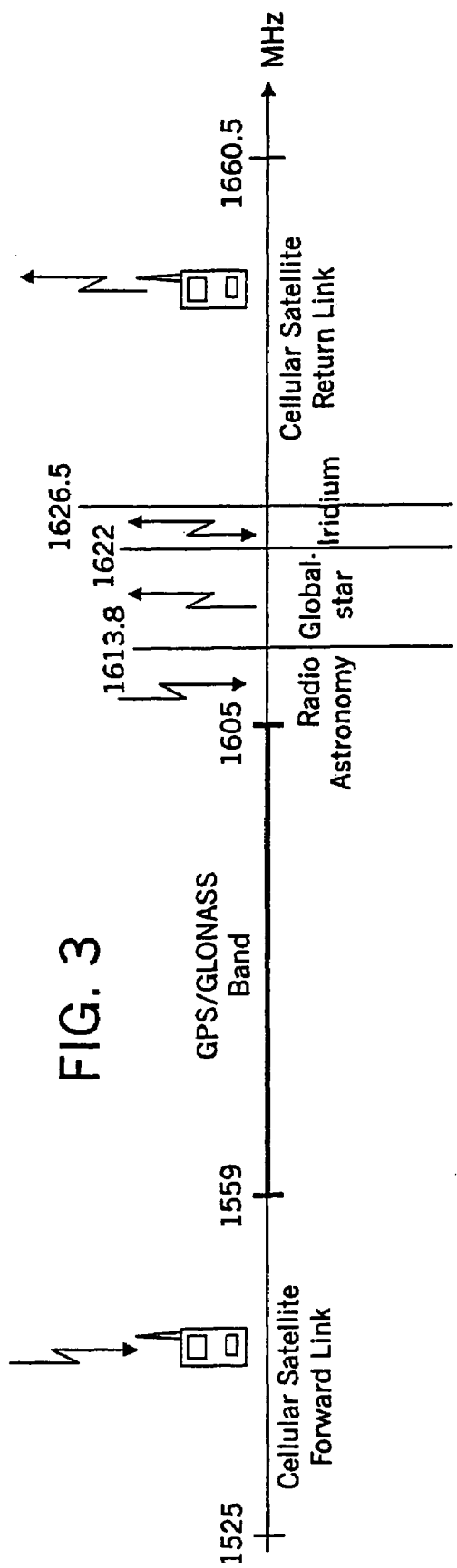
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4-12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
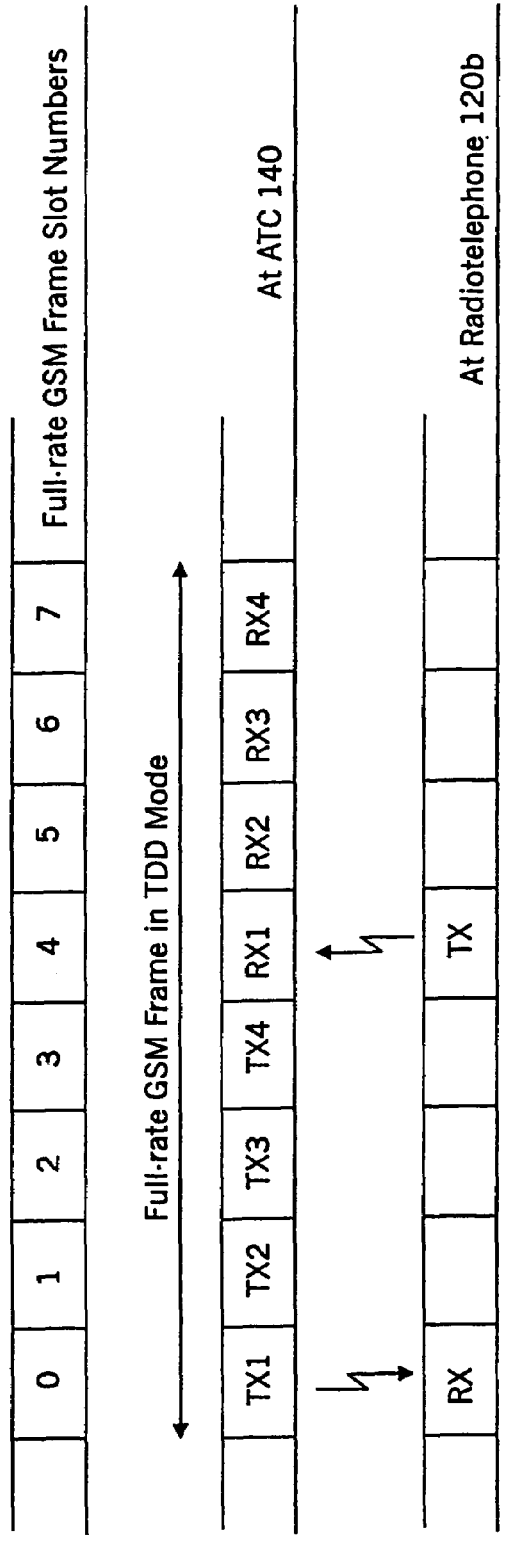
FIG. 5 illustrates time division duplex frame structures according to embodiments of the present invention.
Figure 4:
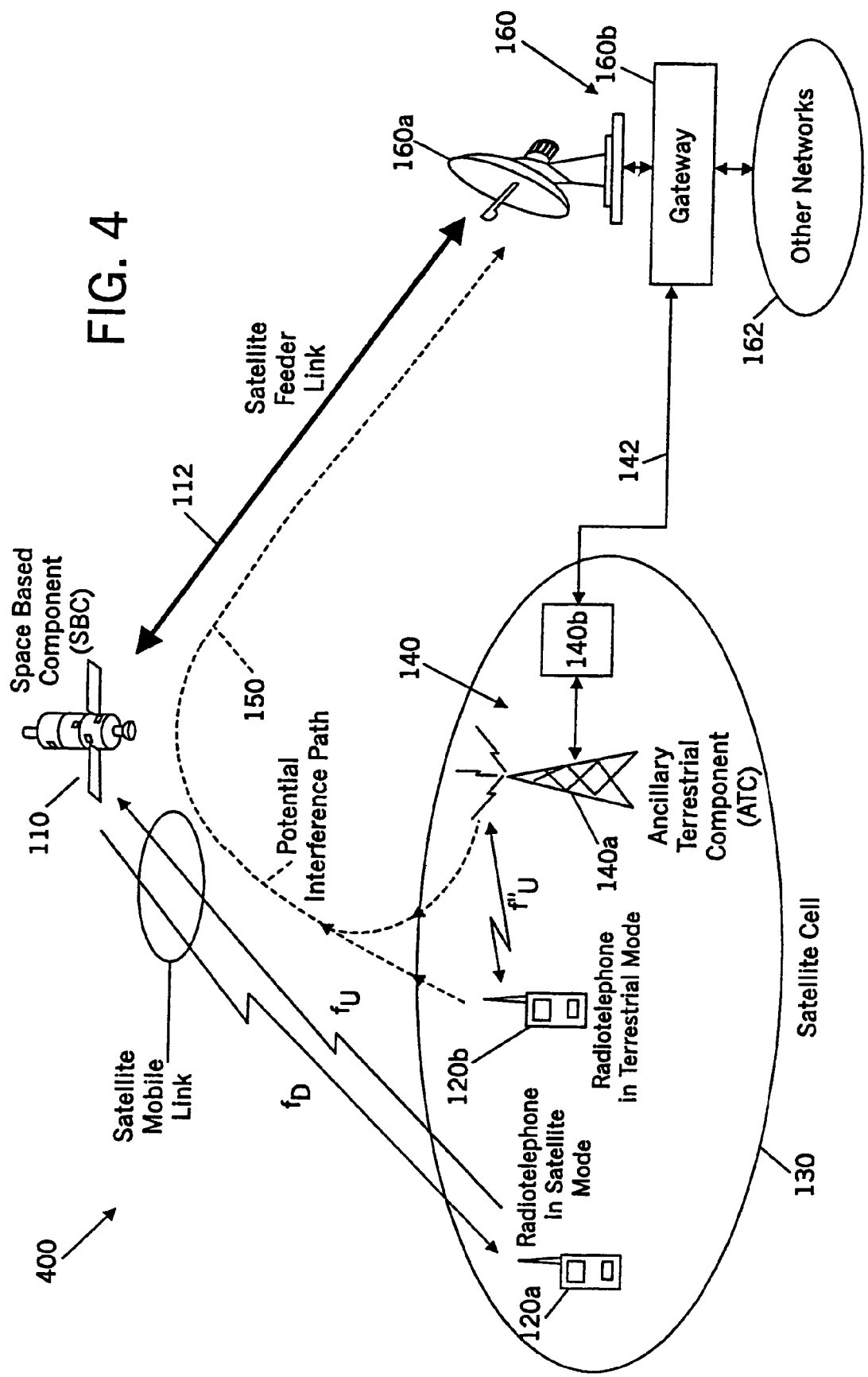
FIG. 4 is a schematic diagram of cellular satellite systems and methods according to other embodiments of the present invention.

FIG. 4 illustrates satellite systems and methods 400 according to some embodiments of the invention, including an ATC 140 communicating with a radiotelephone 120b using a carrier frequency f"$_u$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)=64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8)≈32 kbps on the return link.

Figure 6:
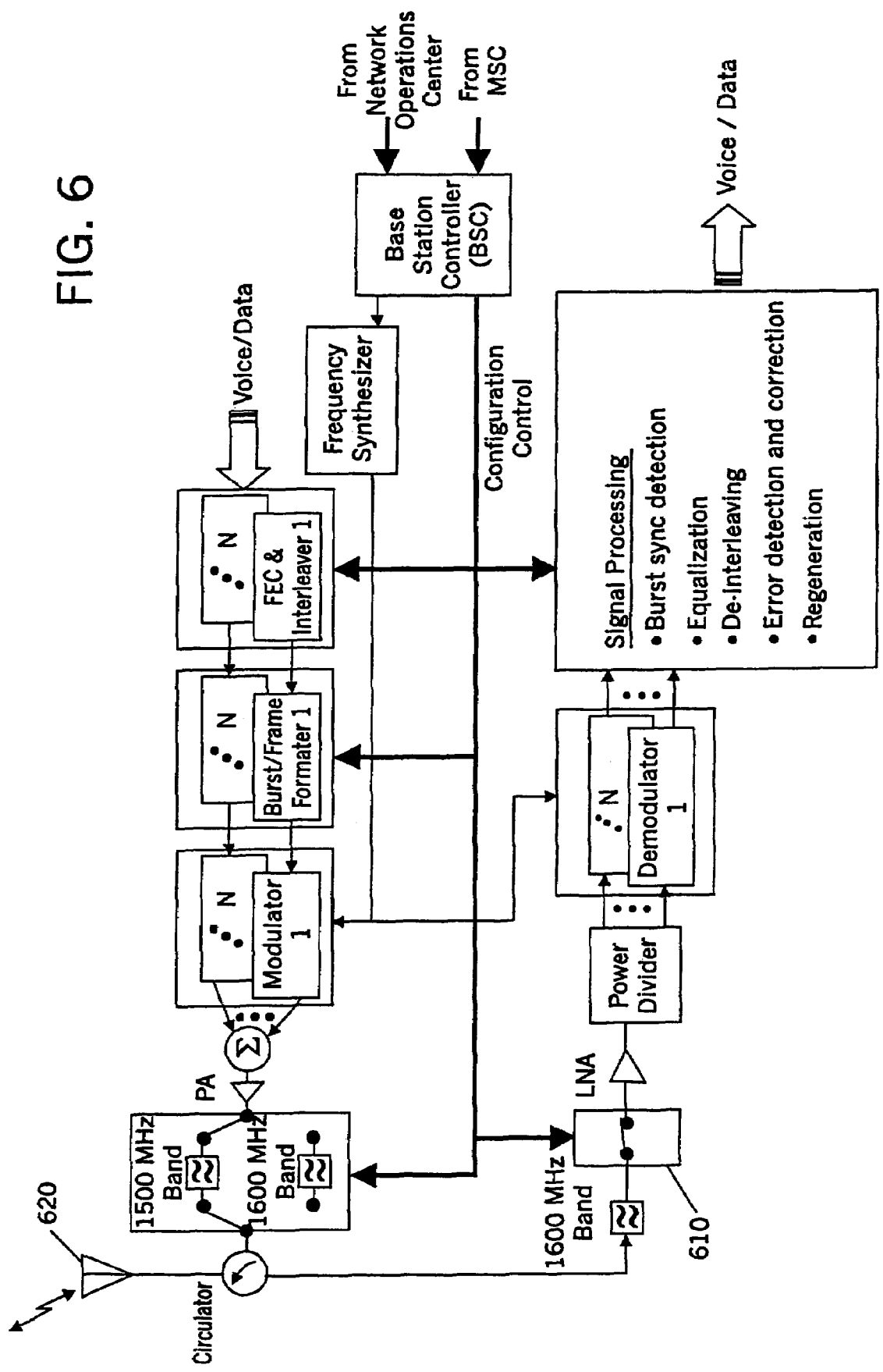
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
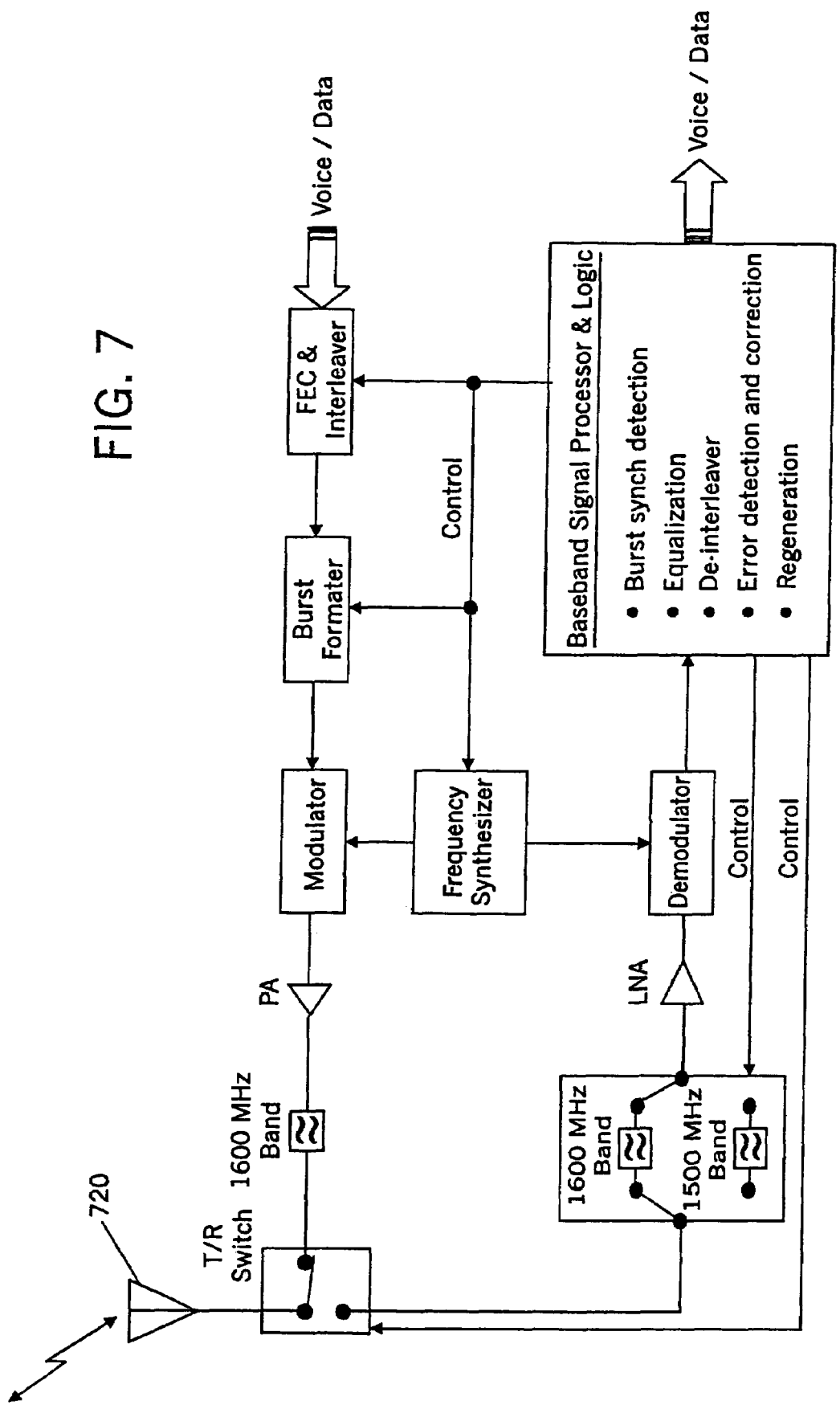
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Figure 8:
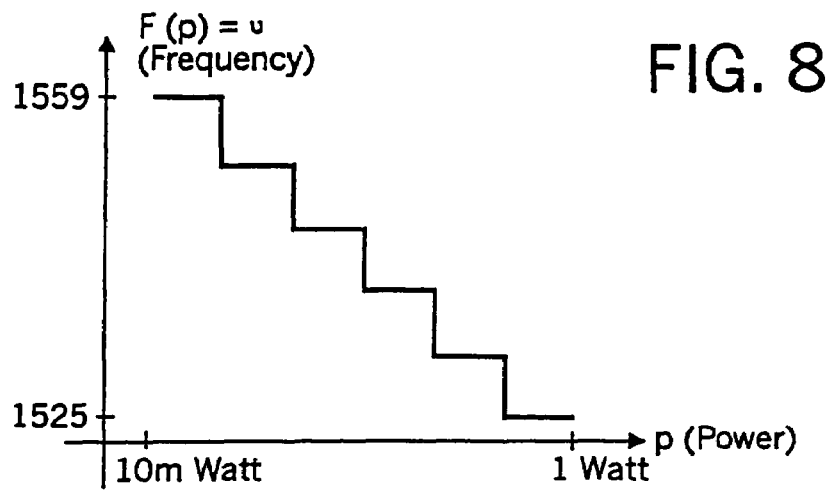
FIG. 8 graphically illustrates mapping of monotonically decreasing power levels to frequencies according to embodiments of the present invention.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=\mathcal{F}(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency ($v$) is the satellite carrier frequency that the ATC uses to communicate with the radiotelephone. According to embodiments of the invention, the mapping $\mathcal{F}$ is a monotonically decreasing function of the independent variable $v$. Consequently, in some embodiments, as the maximum ATC power increases, the carrier frequency that the ATC uses to establish and/or maintain the communications link decreases. FIG. 8 illustrates an embodiment of a piece-wise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

Figure 9:
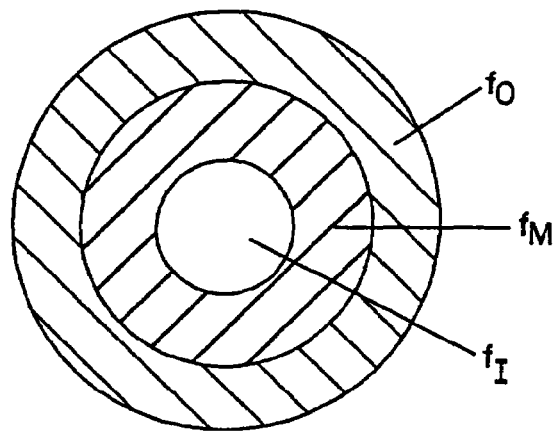
FIG. 9 illustrates an ideal cell that is mapped to three power regions and three associated carrier frequencies according to embodiments of the invention.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with fi relative to the distance between cell centers. This may also hold for $f_M$.

Figure 11:
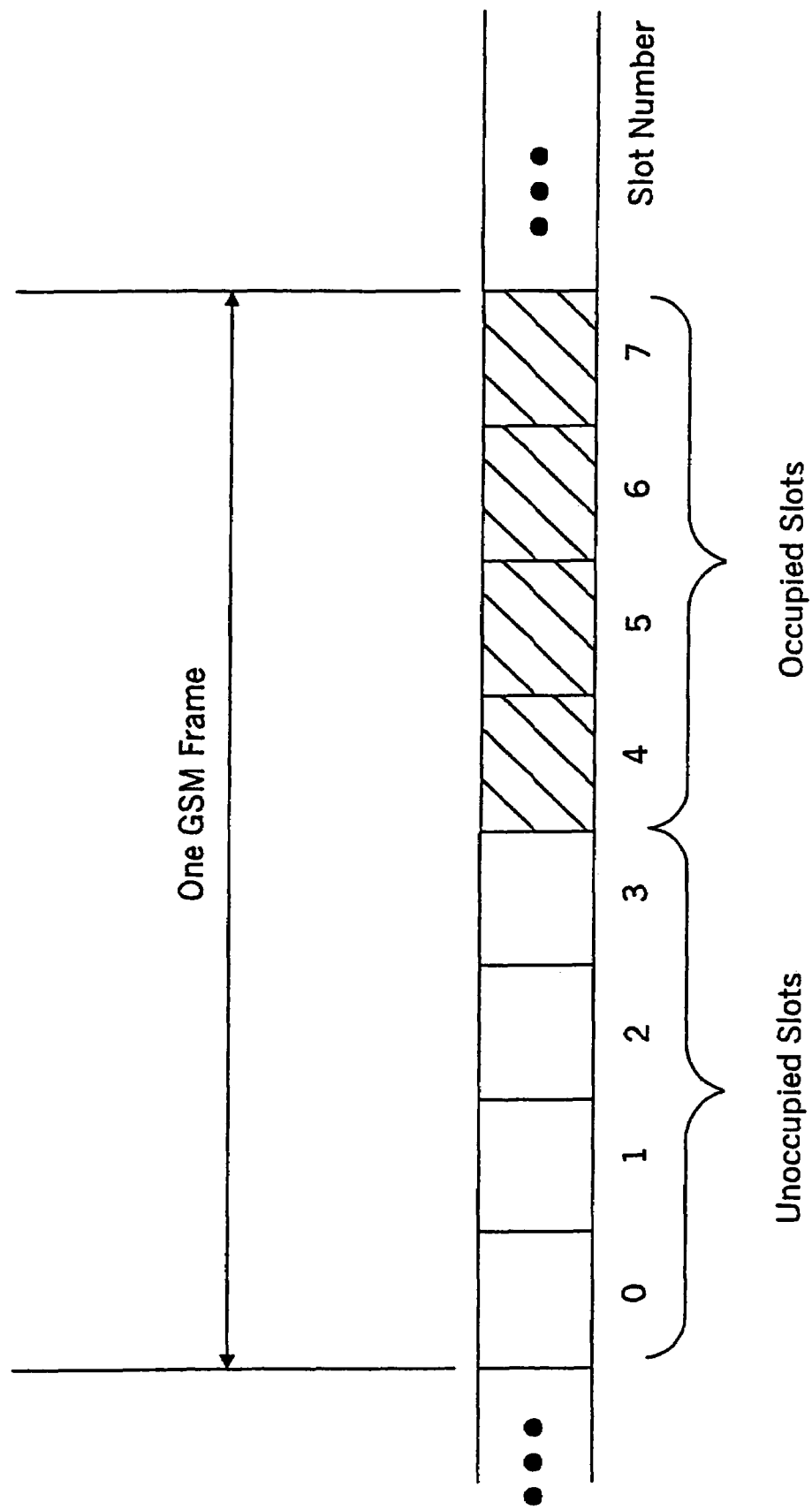
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4-7) being used and four contiguous slots (0-3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

Figure 10:
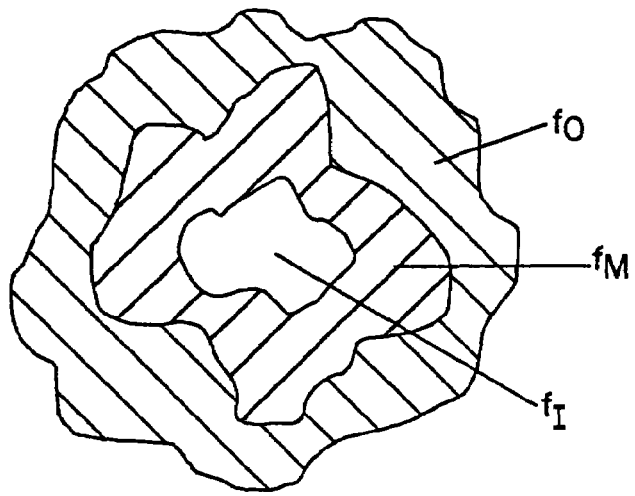
FIG. 10 depicts a realistic cell that is mapped to three power regions and three associated carrier frequencies according to embodiments of the invention.

According to other embodiments of the invention, embodiments of FIGS. 8-10 can be combined with embodiments of FIG. 11. Furthermore, according to other embodiments of the invention, if an $f_I$ carrier of FIGS. 9 or 10 is underutilized, because of the relatively small footprint of the inner-most region of the cell, it may be used to support additional traffic over the much larger outermost region of the cell.

Figure 12:
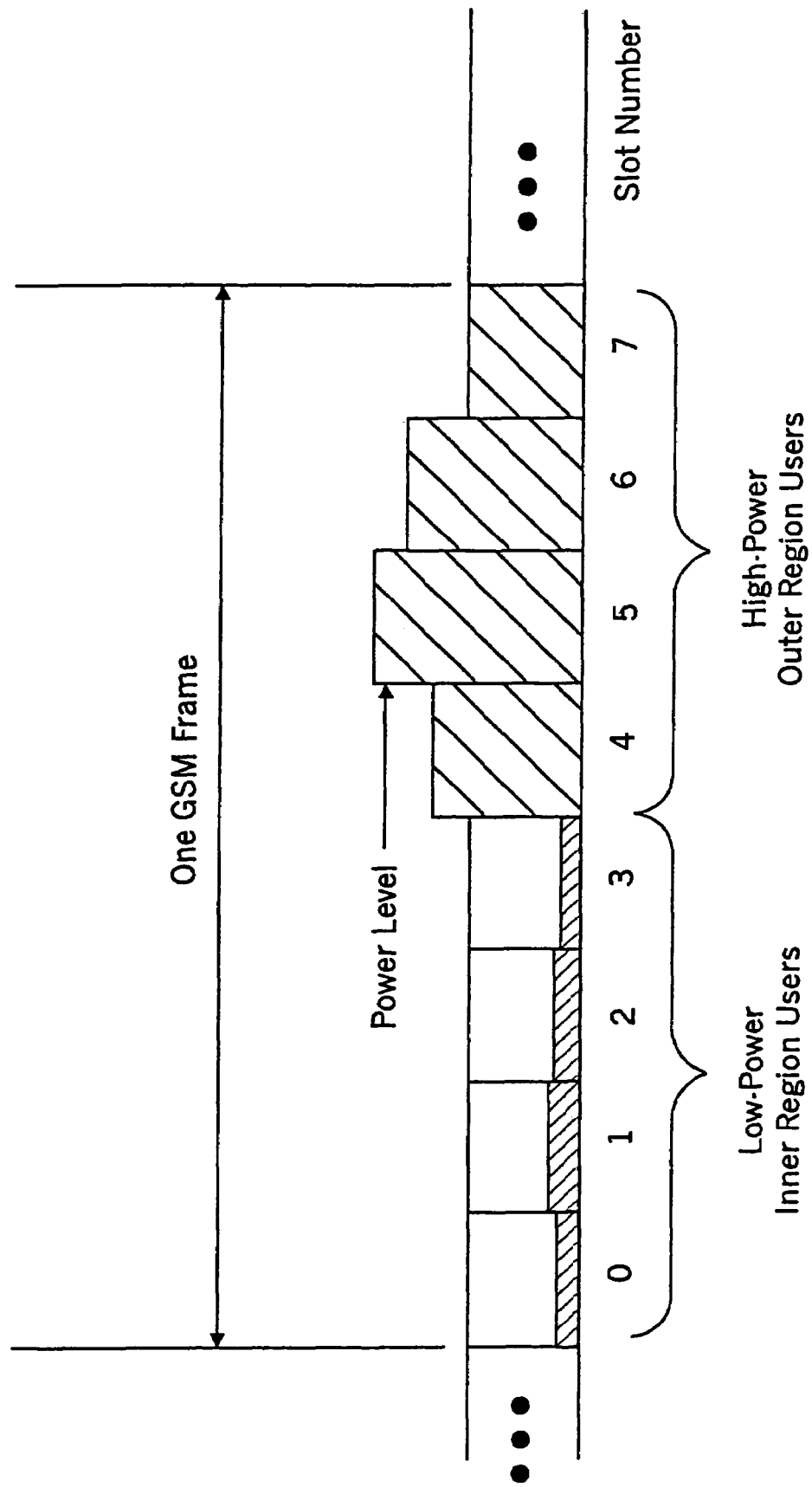
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8-10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to underpopulate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per caller that may be aimed at a particular user, may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11-12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIGS. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Monitoring Terrestrially Reused Satellite Frequencies to Reduce Potential Interference As was described above, for example, in connection with FIGS. 1 and 2, an ancillary terrestrial network comprising one or more ancillary terrestrial components 140 in each satellite radiotelephone cell 130, may be used to enhance the cellular satellite radiotelephone system availability, efficiency and/or economic viability, by terrestrially reusing at least some of the frequency bands that are allocated to cellular satellite radiotelephone systems. Thus, as was described, for example, in connection with FIG. 1, in a given satellite cell 130 that uses one or more frequencies within the satellite radiotelephone frequency band for satellite communications, the frequencies of satellite cell 130, and at least some frequencies of the remaining satellite cells 130'-130'''' also may be reused terrestrially by the ancillary terrestrial network within the given satellite cell 130. Moreover, as was also described in connection with FIG. 1, the one or more satellite uplink frequencies that are used in the given cell may also be reused terrestrially, using interference reducing techniques. Thus, within a given satellite cell, terrestrial reuse of some or all of the satellite frequencies may occur.

Unfortunately, the signals that are radiated by the ancillary terrestrial network and/or the radiotelephones that communicate therewith, may be sufficiently strong and/or numerous to potentially interfere with other satellite radiotelephone systems, even when they do not interfere with satellite radiotelephone systems according to embodiments of the present invention.

In order to reduce or eliminate interference by the ancillary terrestrial network and/or the radiotelephones that communicate therewith, with other satellite radiotelephone systems, some embodiments of the present invention can include systems and methods for monitoring terrestrially reused satellite frequencies and can control the number, geographic distribution and/or power of the radiation by the ancillary terrestrial network and/or the radiotelephones that communicate therewith, to reduce or eliminate potential interference with other satellite radiotelephone systems. Interference within the given satellite radiotelephone system (intra-system interference) also may be reduced by this monitoring, according to some embodiments of the present invention.

Figure 16:
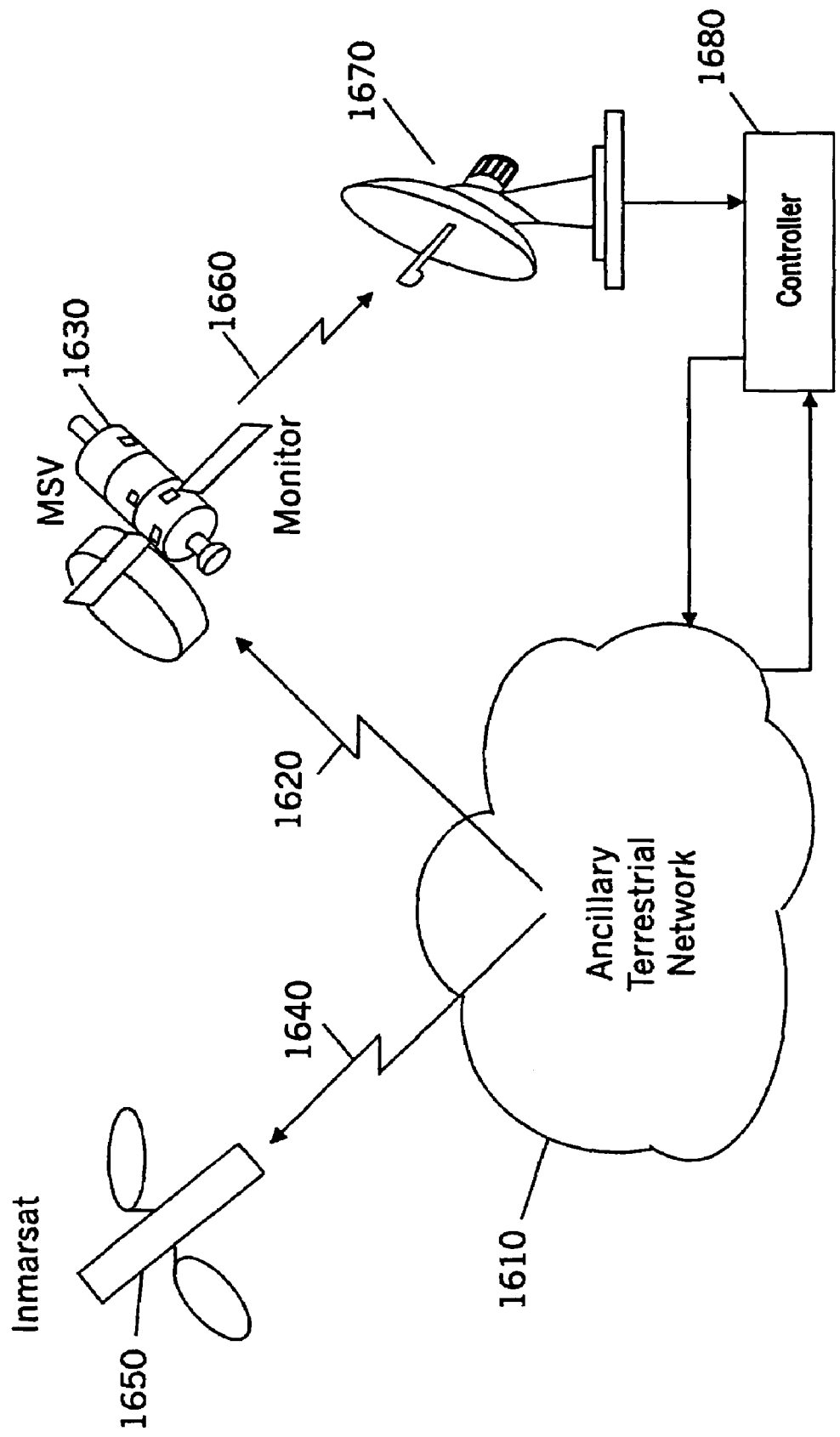
FIG. 16 is a schematic diagram of cellular radiotelephone systems and methods according to embodiments of the invention.

Thus, as shown in FIG. 16, satellite radiotelephone systems and methods according to some embodiments of the invention include a space-based component 1630 (also referred to as a first space-based component) and an ancillary terrestrial network 1610, that are marketed, for example, by Mobile Satellite Ventures LP ("MSV"), the assignee of the present application. The ancillary terrestrial network 1610 and/or the radiotelephones that communicate therewith (also referred to as a plurality of first radiotelephones), can radiate uplink signals 1620 that may be sufficiently strong to be captured by the space-based component 1630 of the cellular satellite radiotelephone system. These signals from the ancillary terrestrial network 1610 also may act as interfering signals 1640 for a satellite 1650 (also referred to as a second space-based component) of another satellite radiotelephone system, such as the Inmarsat system. According to some embodiments of the present invention, systems and methods may be provided for monitoring terrestrially reused satellite frequencies, for example by providing a monitoring signal 1660 to a gateway 1670 of the satellite radiotelephone system. The number, geographic distribution and/or power of the radiation by the ancillary terrestrial network 1610 and/or the radiotelephones that communicate therewith may be controlled by a controller 1680, to reduce or eliminate the interference 1640 with the second space-based component 1650. In other embodiments, the number, geographic distribution and/or power of the radiation by radiotelephones that communicate directly with the space-based component 1630 (also referred to as a plurality of second radiotelephones) also may be monitored and/or controlled. It will be understood by those having skill in the art that at last some of the plurality of first radiotelephones also may be configured to communicate directly with the second space-based component 1650 and that at least some of the plurality of second radiotelephones also may be configured to communicate directly with the first space-based component 1630, such that at least some of the plurality of first and second radiotelephones are capable of changing roles or playing both roles.

Figure 13:
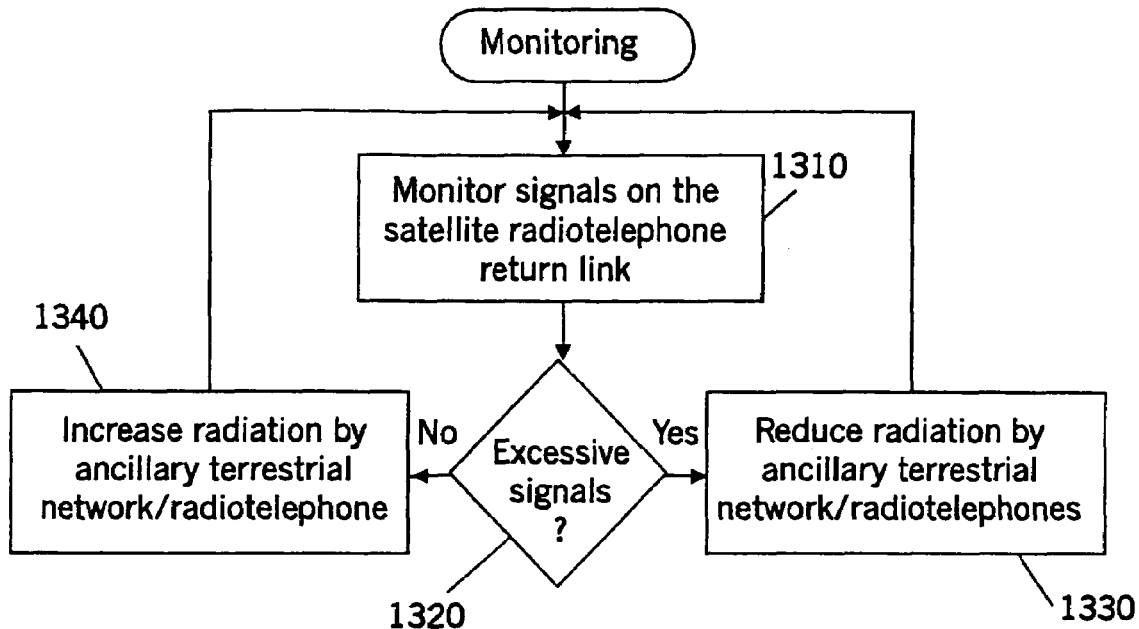
FIG. 13 is a flowchart of operations for monitoring according to embodiments of the present invention.

FIG. 13 is a flowchart illustrating overall operations for monitoring radiation generated by an ancillary terrestrial network and/or the radiotelephones that communicate therewith, and adjusting the radiation by the ancillary terrestrial network and/or the radiotelephone that communicate therewith in response to the monitoring, according to embodiments of the present invention. These operations may be performed, for example, by the space-based component 1630, gateway 1670 and/or controller 1680 of FIG. 16.

Referring to FIG. 13, at Block 1310, the signals on the satellite radiotelephone return link (uplink), for example link 1620 of FIG. 16, are monitored to identify signals that are generated by the ancillary terrestrial network, such as the ancillary terrestrial network 1610 of FIG. 16, and/or the radiotelephones that communicate therewith. At Block 1320, if the signals are excessive, so as to potentially interfere with other satellite radiotelephone systems, such as the satellite 1650 of FIG. 16, then, at Block 1330, the radiation by the ancillary terrestrial network and/or the radiotelephones that communicate therewith can be reduced selectively. Alternatively, if the signals are not excessive at Block 1320, then the radiation by the ancillary terrestrial network and/or the radiotelephones that communicate therewith can remain at the same level or can be increased at Block 1340. Monitoring according to some embodiments of the invention may be provided repeatedly, on a continuous basis, or periodically.

Figure 14:
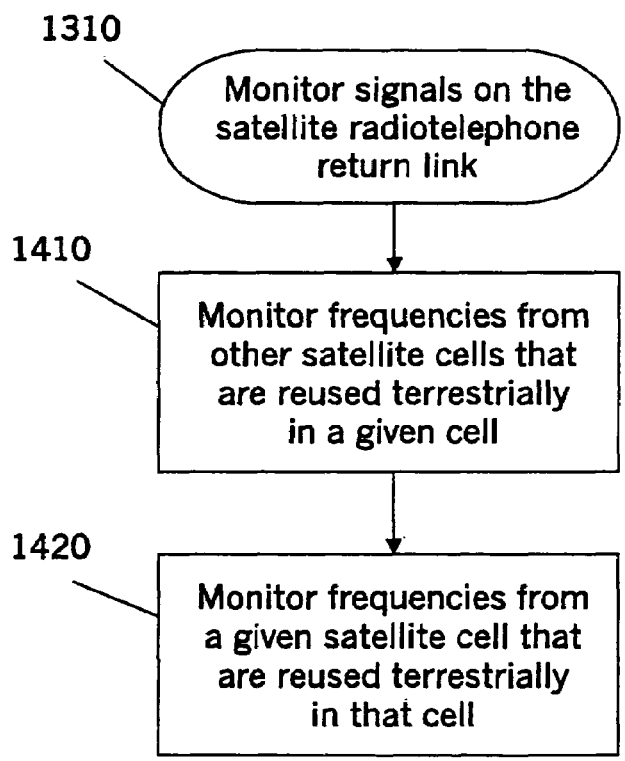
FIG. 14 is a flowchart of operations for monitoring signals on the satellite radiotelephones return link according to embodiments of the present invention.

Referring now to FIG. 14, additional details of monitoring (Block 1310 of FIG. 13) according to some embodiments of the invention now will be described. In particular, at Block 1310, the signals on the satellite radiotelephone return link are monitored to detect radiation by the ancillary terrestrial network and/or the radiotelephones that communicate therewith. Two types of radiation by the ancillary terrestrial network and/or the radiotelephones that communicate therewith within a given satellite cell may be monitored. In first embodiments of monitoring, the monitored radiation includes radiation, by the ancillary terrestrial network and/or radiotelephones that can communicate therewith within a given satellite cell, of frequencies that are not used for space-based communications within the given satellite radiotelephone cell (Block 1410). In second embodiments of monitoring, the monitored radiation includes radiation, by the ancillary terrestrial network and/or radiotelephones that communicate therewith within a given satellite cell, of satellite frequencies that are used by the space-based component within the given satellite cell and also are reused by the ancillary terrestrial network in the given cell (Block 1420). Each of these embodiments of monitoring will now be described in detail.

In the first embodiments of monitoring (Block 1410), a frequency or set of frequencies is used for space-based communications within a given satellite cell. Satellite frequencies other than this set of frequencies may be used by other satellite cells and also may be reused terrestrially within the given cell. For example, assume a seven-cell frequency reuse pattern including satellite radiotelephone cells 1-7. In cell 1, assume a set of uplink frequencies F1 is used. The uplink frequencies F2-F7 that are used in cells 2-7 also may be reused terrestrially, without interference or with substantially low interference, within the cell 1. In these embodiments, the set of frequencies F2-F7 is monitored in cell 1 by the space-based component 1630, to detect the radiation at frequencies F2-F7.

In the second embodiments of monitoring (Block 1420), frequencies that are used for space-based communication within a given cell also are used for communication with the ancillary terrestrial network in the given cell, and interference may be reduced or canceled using an interference reducer, as was described in connection with FIG. 1. Thus, in these embodiments, a measure of the amount of interference that is reduced by the interference reducer of FIG. 1 also can provide an indication of the amount of power that is being radiated by the ancillary terrestrial network and/or the radiotelephones that communicate therewith within the given cell.

It will be understood that only the first embodiments of monitoring (Block 1410) may be used in some embodiments of the present invention to provide a relatively straightforward technique for monitoring radiation by the ancillary terrestrial network and/or the radiotelephones that communicate therewith, by monitoring radiation at frequencies that are not used for space-based communications within the given satellite cell. Monitoring of the satellite band frequencies that are used by a given satellite cell and that also are reused terrestrially within the same satellite cell may not need to be performed. Instead, the amount of radiation at those satellite cell frequencies that are also reused terrestrially (intra-satellite beam wise) may be estimated or extrapolated based on the monitoring of the frequencies from other cells that are reused terrestrially in the given satellite cell. An input to deriving the estimate may be the ancillary terrestrial network loading or traffic profile over the set of frequencies used in that satellite cell. In other embodiments, only the second embodiments of monitoring (Block 1420) may be used, by deriving a measure of the amount of radiation that reaches the space-based component from the amount of interference that is reduced or canceled by the interference reducer. In still other embodiments, both embodiments of monitoring (Blocks 1410 and 1420) may be used.

Many techniques may be used to monitor frequencies from other satellite cells that are reused terrestrially in a given satellite cell (Block 1410 of FIG. 14). In particular, the actual signals that are received at the space-based component 1630 may be relayed to a gateway 1670 or other component of the cellular satellite system by the space-based component. Alternatively, power level measurements may be obtained by the space-based component 1630, so that only power level measurements may need to be relayed to the terrestrial components. Similarly, when monitoring frequencies from a given satellite cell that are reused terrestrially in the given satellite cell (Block 1420 of FIG. 14), the interfering signal may be provided to a gateway 1670, or the power of the signal that is being suppressed by the interference reducer may be used as a measurement of the amount of radiation by the ancillary terrestrial network and/or the radiotelephones that communicate therewith. Other techniques for measuring the power or signal level that is radiated by the ancillary terrestrial network and/or the radiotelephones that communication therewith within a cell also may be used.

One technique for estimating (in the presence of noise) the aggregate signal level generated by the ancillary terrestrial network and reaching the space-based component, according to some embodiments of the present invention, now will be described. This technique can identify signals from the ancillary terrestrial network and/or the plurality of second radiotelephones that are received on the uplink in the presence of noise. In particular, in some embodiments, the received signal plus noise power spectral density of the signals that are received on the uplink is measured at a plurality of frequencies in the satellite radiotelephone frequency band. A difference is obtained between selected ones of the plurality of frequencies in the satellite radiotelephone frequency band. This difference is used to reduce the effect of the noise on the measurement.

Figure 17:
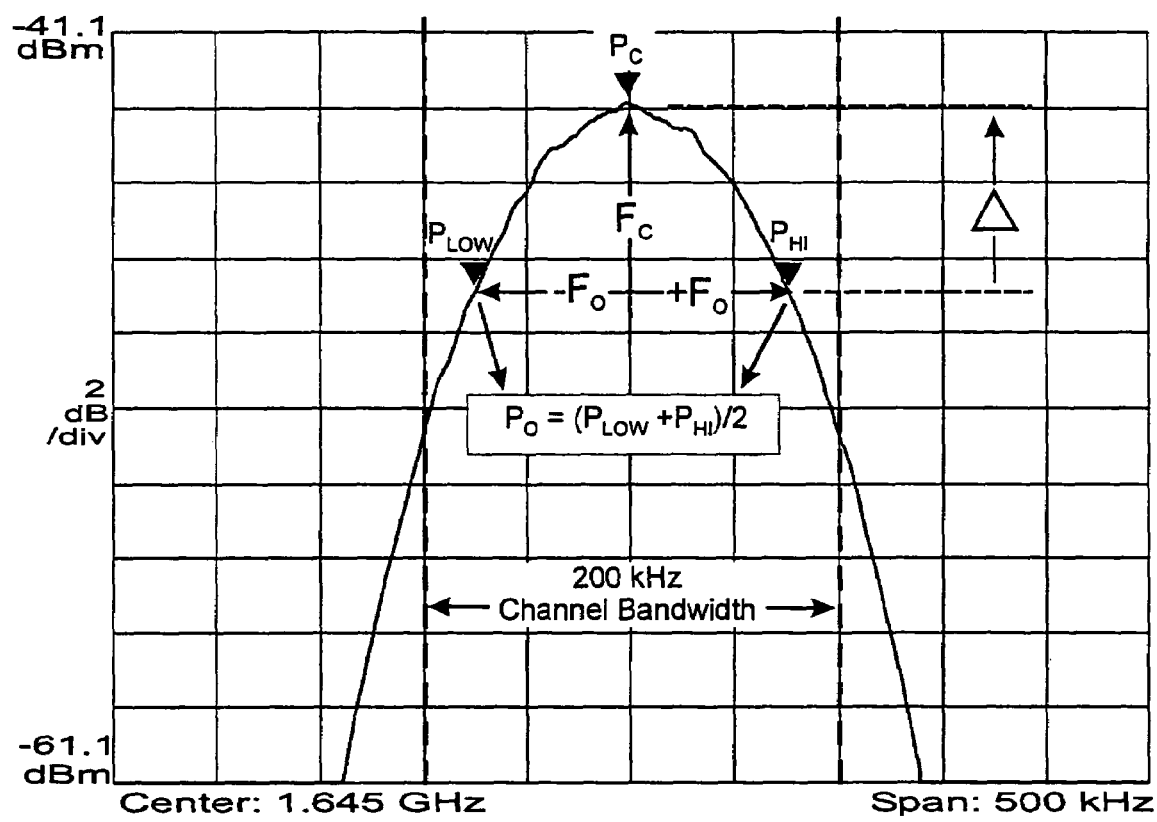
FIG. 17 graphically illustrates power spectral density of a GSM/GMSK caller according to embodiments of the present invention.

More specifically, embodiments of the present invention that can estimate the aggregate signal level generated by the ancillary terrestrial network and reaching the space-based component may be referred to herein as "Delta-Power Spectral Density" (Δ-PSD) embodiments. The Δ-PSD embodiments derive their estimate of the interference caused by the ancillary terrestrial network by performing measurements on the aggregate ancillary-signal-plus-noise over the satellite uplink path. The Δ-PSD embodiments also can rely on knowledge of frequency-domain signatures (i.e., the power spectral density characteristic) of the signals that the ancillary terrestrial network is emitting. As an illustrative example, FIG. 17 shows the power spectral density of a GSM/GMSK carrier.

Some of the Δ-PSD embodiments measure the received signal plus thermal noise power spectral density at the ancillary signal carrier center frequency and at frequencies corresponding to a given frequency offset above and below the carrier center frequency. Referring again to FIG. 17, let $P_C$ (dBm/Hz) be the measured signal plus noise density at the (GMSK) carrier center frequency $F_C$ over the satellite return or uplink path. Let $P_{HI}$ and $P_{LOW}$ (dBm/Hz) denote the signal plus noise densities measured at a given frequency offset $F_O$ above and below the center frequency $F_C$, respectively. Finally, let $P_O$ be the arithmetic average of $P_{HI}$ and $P_{LOW}$ (as defined in FIG. 17). In the absence of noise, the difference between $P_C$ and $P_O$, indicated as Δ in FIG. 17, is the known difference in (GMSK) power spectral density for the given frequency offset $F_O$.

Let C (dBm) be the aggregate ancillary signal power received over the satellite return path for a given channel and spot beam (where the spot beam does not use the same channel for satellite communications). Then, C can be estimated from the measurements $P_C$ and $P_O$ (in the presence of noise) using the following equations:

$$C = 10 \log(10^{P_C/10} - 10^{P_O/10}) - K_1 + K_2,$$

$$K_1 = 10 \log(1 - 10^{-\Delta/10}),$$

$$\Delta = P_C - P_O$$

The quantity Δ is in dB, and, as FIG. 17 illustrates, denotes the difference between $P_C$ and $P_O$ as measured (or calculated) in a noiseless environment. The quantity $K_2$ is a constant that relates the total carrier power C to the corresponding power spectral density at the carrier center frequency. For GSM/GMSK, $K_2$ was measured to be about 51.0 dB-Hz. That is, for a carrier power spectral density (at the center of the carrier's spectrum) of X dBm/Hz, the corresponding total carrier power is X+51 dBm.

Accordingly, the quantity C may be used to estimate the aggregate ancillary signal power without the need to explicitly measure the overlaid channel thermal noise density. This can reduce or eliminate the potential network disruption of having to remove the ancillary carriers in order to obtain a calibrated noise-only measurement.

In some embodiments of the Δ-PSD technique, the measured power spectral densities $P_C$ and $P_O$ generally will exhibit time fluctuations that may be averaged out before the power spectral densities are used in the above equation. It also may be desirable to apply sufficient time averaging on the measurements $P_C$ and $P_O$ to reduce the variations to the order of about ±0.1 dB in some embodiments. In order to reduce any effects of level changes that may occur during the averaging period, it may also be desirable to perform the $P_C$ and $P_O$ measurements at the same time.

Moreover, for the above equation to yield accurate results, the time-averaged thermal noise density in the satellite channel may need to be essentially flat over the measurement span of $F_C \pm F_O$. However, a stable passband variation (such as due to filtering) can be accommodated by applying appropriate correction factors to the $P_C$ and $P_O$ measured values.

In some embodiments, the selection of the measurement frequency offset $F_O$ may be driven by two competing factors. First, a larger value for $F_O$ increases the Δ value shown in FIG. 17, which in turn can improve the accuracy and repeatability of the equation results. However, as also shown in FIG. 17, the GSM/GMSK spectrum produces significant energy spillover into the adjacent channels. Therefore, when measuring $P_O$, a smaller value for $F_O$ may provide greater discrimination against signal energy from the adjacent channel.

Finally, if in an adjacent satellite spot beam a radiotelephone in satellite mode is transmitting co-frequency with the ancillary terrestrial network, the power received in the spot beam performing the ancillary signal measurements, due to the radiotelephone transmitting in satellite mode in the adjacent beam, may be larger than the aggregate ancillary signal level that is being measured. Since the measurement may not discriminate between satellite-mode and ancillary-mode signal power, adjacent-beam satellite transmissions may need to be suspended around the center frequency $F_C$ and $\pm F_O$ offsets during the $P_C$ and $P_O$ measurements.

Referring again to FIG. 13, at Block 1320, a determination is made as to whether excessive signals are radiated by the ancillary terrestrial network. Excessive radiation may be measured on all or some frequencies, in all or some geographic areas, and/or at a point in time or over an extended period of time. Many techniques for dynamically or statically measuring whether excessive signals are being radiated by the ancillary terrestrial network and/or the radiotelephones that communicate therewith will be understood by those having skill in the art and need not be described further herein.

Still referring to FIG. 13, at Blocks 1330 and 1340, the ancillary terrestrial network radiation is reduced, or increased or allowed to remain the same, respectively, based on the signal measurement. It will be understood that the increase or decrease (or no action taken) in ancillary terrestrial network and/or radiotelephone radiation may be accomplished across the entire ancillary terrestrial network and/or radiotelephones, or over only selective ancillary terrestrial components and/or radiotelephones in the ancillary terrestrial network. Moreover, increases or decreases (or no action taken) may be performed selectively at various frequencies or at all frequencies in the uplink frequency band.

In some embodiments of the present invention, the satellite radiotelephone system has knowledge, at any given time, of the position of each active radiotelephone, whether in the satellite mode or in the ancillary terrestrial mode. For example, the radiotelephone may be equipped with GPS-based position determination systems. Each active radiotelephone can periodically report to the system a plurality of parameters including its position coordinates, its output power level, and whether or not it is capable of receiving and decoding the satellite Broadcast Control CHannel (BCCH).

In response to the monitoring of the aggregate ancillary terrestrial signal reaching the space-based component, certain radiotelephones that are active in the ancillary terrestrial mode and are capable of receiving the satellite BCCH, may be commanded to switch over to the satellite mode. This switch may occur if the level of the aggregate ancillary signal, as monitored by the space-based component, is either approaching, has reached, or has exceeded a predetermined power threshold. The radiotelephones that are able to receive and decode the satellite BCCH and are radiating at or near maximum power can be candidates for handing off to the space-based component.

In still other embodiments, the potential interference may be reduced or eliminated by selecting a vocoder rate of a radiotelephone in terrestrial mode in response to the aggregate interference level provided by monitoring and the radiotelephone's output power. In particular, the radiotelephone may contain at least two groups of vocoders. A vocoder from the first group of vocoders may be selected and used when the radiotelephone is engaged in satellite-mode voice communications. The first group of vocoders may include, for example, a 3.6 kbps vocoder, a 2.4 kbps vocoder, and a 2.0 kbps vocoder. A vocoder from the second group of vocoders may be selected and used when the radiotelephone is engaged in ancillary terrestrial mode voice communications. The second vocoder group may include, for example, a full-rate GSM vocoder, a half-rate GSM vocoder, a quarter-rate GSM vocoder, a 3.6 kbps vocoder, a 2.4 kbps vocoder, and a 2.0 kbps vocoder.

In general, as the vocoder rate is reduced, fewer information bits are generated and thus fewer bits may need to be transmitted per unit of time. Therefore, keeping the transmitted energy per bit invariant (since the energy per bit generally dictates communications performance), a transmitting device such as a radiotelephone can reduce its average output power level by using a lower rate vocoder.

When monitoring of the aggregate signal power that is generated by ancillary terrestrial operations according to embodiments of the invention reveals a level of interference that is undesirable or unacceptable, action can be taken to reduce the interference. This action may entail sending a command to the radiotelephones that are operating at or near maximum power to reduce their vocoder rate. If need be, other radiotelephones that are not operating at or near maximum power may also be commanded to reduce their vocoder rates to relieve the interference situation further.

Additional qualitative considerations for systems and methods for monitoring terrestrially reused satellite frequencies to reduce interference according to some embodiments of the present invention now will be described. In particular, referring again to FIG. 16, in order to allow the network components (space and ancillary terrestrial) to continue, over the life of the system, to interoperate with high or maximum efficiency, embodiments of the invention can include built-in monitoring. The space-based segment can monitor, in real time, the aggregate ancillary signal that is generated by ancillary terrestrial operations. Based on inputs from monitoring, closed loop feedback control may be imposed on some or all of ancillary terrestrial components in the ancillary terrestrial network 1610, such that the aggregate ancillary signal being measured by the space-based component 1630 does not exceed potentially harmful limits. The space-based component 1630 associated with the system containing and operating the ancillary terrestrial network generally will be more susceptible to the effects of the aggregate ancillary signal because the elevation angles to the space-based component 1630 generally will be greater than the corresponding elevation angles of other satellites 1650. For example, the average elevation angle (over the continental United States) to MSV's 101°W satellite is 43°. The same average, taken for the Inmarsat 3 satellite at 54°W is 30°. Moreover, the satellite antenna discrimination relative to terrestrial reuse of frequencies of the system containing and operating the ancillary terrestrial network will generally be less of other satellites 1650.

Accordingly, other cellular satellite systems such as Inmarsat can be protected because potentially harmful ancillary signal levels 1620 will be seen first by the space-based component 1630 and thus can be maintained under control. The aggregate signal power being received at the space-based component 1630 from its ancillary terrestrial components and/or radiotelephones that operate in the ancillary terrestrial network 1610 may be monitored (Block 1310 of FIG. 13), and may be limited accordingly to the extent necessary or desirable to protect satellite 1630 operations and those of other satellite radiotelephone systems 1650.

Several levels of monitoring of the aggregate signal level generated by ancillary terrestrial frequency reuse in the satellite radiotelephone system may be performed by the space-based component 1630, according to some embodiments of the invention. In some embodiments, every return link beam formed by the space-based component 1630 can monitor the aggregate signal level generated by that component of the overall ancillary terrestrial network 1610 that exists within the geographic area spanned by the relevant satellite beam, i.e., intra-system, intra-beam monitoring. By combining (summing) the contributions from the plurality of satellite beams, the total aggregate signal generated by the entire ancillary network and reaching the space-based component 1630 can be measured and recorded. A centralized system controller 1680 can monitor signal levels and, via closed-loop feedback control, can set appropriate limits on ancillary traffic. This is further explained as follows:

Let $S_n(t,f)$ denote the aggregate ancillary signal power, at carrier frequency f, that is generated within the service area of the $n^{th}$ satellite beam, at time t, and reaching the space-based component 1630. This signal power may be measured and recorded by the system at regular intervals of time, $\{t, t+\Delta\tau, t+2\Delta\tau, \ldots\}$, and this can be performed for each beam (n=1, 2, ..., N) and for each co-channel ancillary carrier frequency f. Based on this information, the total aggregate ancillary signal power reaching a distant satellite 1650 at time t, and at co-channel carrier frequency f can be evaluated as follows:

$$S_T(t,f) = \alpha_1 \xi_1 S_1(t,f) + \alpha_2 \xi_2 S_2(t,f) + \ldots + \alpha_N \xi_N S_N(t,f),$$

where, $\alpha_n$=antenna discrimination of the distant satellite 1650 relative to geographic area spanned by the $n^{th}$ satellite beam of the space-based component 1630, (n=1, 2, ... N), $S_n(t,f)$=aggregate ancillary signal power received by the $n^{th}$ beam of space-based component 1630 at time t, and at co-channel carrier frequency f, and, $\xi_n$=elevation-dependent statistical adjustment factor.

If, relative to the area spanned by the $n^{th}$ beam of the space-based component 1630, the elevation angle of the distant satellite 1650 is lower than that of the space-based component 1630, then, for that beam (for that value of n), the elevation-dependent statistical adjustment factor value may be set to unity. This can provide extra protection for the distant satellite system by upper-bounding (in the above equation) the aggregate ancillary signal power that can reach the distant satellite (since as the elevation angle decreases, the probability of blockage increases). In the generally unlikely event that, relative to the area spanned by the nth beam of the space-based component 1630, the elevation angle of the distant satellite 1650 is higher than that of the space-based component 1630, the value of the corresponding elevation-dependent statistical adjustment factor can be set differently. In this case, it can be set to a value that is greater than unity, by an appropriate amount, to account for the effect (since as the elevation angle increases, the probability of blockage decreases). Statistically, the average level of shielding (average signal attenuation) to a geostationary satellite can be expressed by a linear regression fit of the mean attenuation as a function of the elevation angle. The specific relationship:

Mean Attenuation (dB)=19.2−(0.28)(Elevation°), can be used to predict the level of signal attenuation and, therefore, the aggregate signal to be received by a geostationary satellite.

Figure 15:
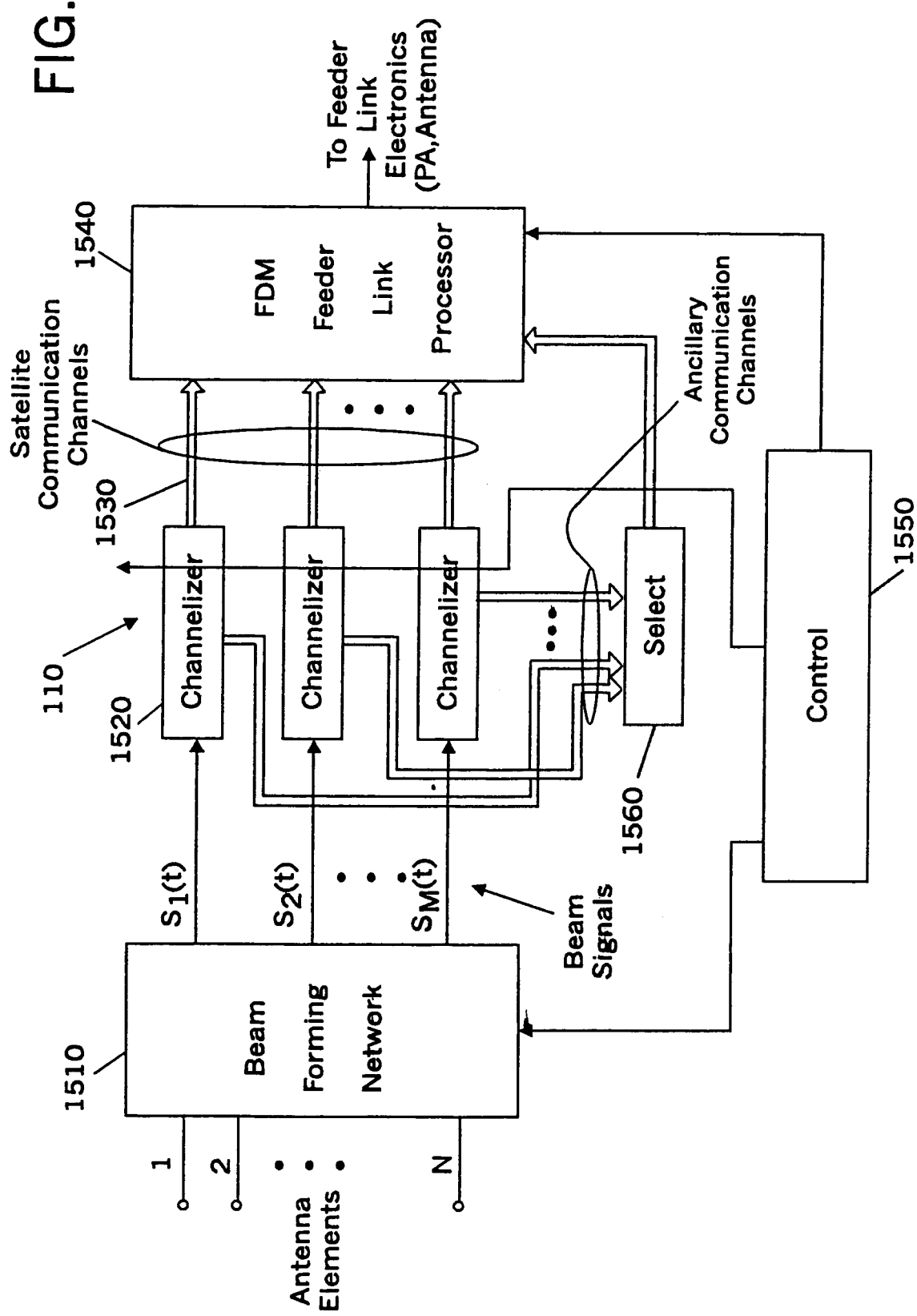
FIG. 15 is a block diagram of embodiments of monitoring frequencies from other satellite cells that are reused terrestrially in a given cell, according to embodiments of the present invention.

FIG. 15 is a block diagram of embodiments of monitoring frequencies from other satellite cells that are reused terrestrially in a given satellite cell (Block 1410 of FIG. 14) that may be practiced by a space-based component 1630 of FIG. 16. In particular, antenna elements 1-N of the space-based component 1630 are connected to a beam-forming network 1510, that produces a plurality of beam signals $S_1(t) \ldots S_M(t)$. These signals are provided to channelizers 1520, which produce a plurality of satellite communication channels 1530 that are provided to a Frequency Division Multiplexing (FDM) feeder link processor 1540. The feeder link processor output is provided to the feeder link electronics, to provide the signal for the satellite return feeder link. A controller 1550 controls the beam forming network 1510, the channelizers 1520 and the feeder link processor 1540.

Still referring to FIG. 15, according to some embodiments of the invention, a selector 1560 can select outputs 1530' of the channelizers 1520 and provide these outputs to the feeder link processor 1540. Thus, the frequencies from other satellite cells that are reused terrestrially in a given satellite cell may be sent to the feeder link by the selector 1560. It will be understood that not all ancillary signals of all beams need to be sent to the ground simultaneously. Moreover, in some embodiments, ancillary signals of beams need not be sent to the ground. Rather, power measurements may be taken on board the space-based component 1630 and only those measurements may be sent to the ground via the satellite TT&C link.

Still other embodiments of monitoring signals on the satellite radiotelephone return link (Block 1310 of FIG. 13) may use a modeling technique to monitor the physical signals. In particular, it will be understood that the system 100 of FIG. 1 generally has knowledge of the locations of each ancillary terrestrial component 140 and each radiotelephone 120. Knowledge of the locations of the radiotelephones 120 may be obtained by a built-in GPS system and/or by the exchange of communication signals during radiotelephone communications. For each geographical area that is covered by a space-based component 110, a model may be built that includes geographic features, buildings, roads and/or other information regarding the morphology that may attenuate or block radiation by the radiotelephones and/or the ancillary terrestrial network. Then, a computer simulation may be used to simulate the level of interference to the space-based component 110 and/or satellite 1650 based on this model.

In particular, still referring to FIG. 1, in the Ancillary Terrestrial Network (ATN), users actively engaged in calls may at times also have clear Line-Of-Sight (LOS) to the space-based component 110, or to satellites of other service providers (referred to herein as "adjacent" satellites). Where clear LOS exists to an adjacent satellite, those users' transmissions can contribute to increasing the noise floor $\Delta T/T$ in the co-frequency channel of the adjacent satellite. Thus, it may be desired for cellular satellite radiotelephone systems according to some embodiments of the invention to maintain the total co-frequency interference due to ATN users to within some established $\Delta T/T$ allowance. Satellite radiotelephone systems and methods according to some embodiments of the invention may not be able to monitor the adjacent satellite noise floor directly, so the interference contribution from the ATN may be estimated from known system parameters and probabilities. Therefore, it may be desirable to have the capability to accurately determine whether each active ATN user has clear LOS to the adjacent satellite, to allow an estimate of the total ATN interference, and thereby allow that the $\Delta T/T$ allowance to not be exceeded.

To this end, according to some embodiments of the invention, the geo-location of the radiotelephones can be used to determine whether an active ATN user has simultaneous LOS to an adjacent satellite. To facilitate these embodiments, each radiotelephone may be equipped with an integrated geo-location capability, such as a GPS receiver. During a call, the user's position information can be continually or periodically transmitted to a Network Control Center (NCC) as part of normal in-call signaling. For each city where an ATN is deployed, the NCC can maintain a detailed geographical database map of the area served, including building heights and/or other structural dimensions. Such databases are already in use supporting activities such as planning cellular base station locations. The NCC can simultaneously track the locations of each active ATN user within its "virtual city" database. By knowing the user's reported position, the relative positions of buildings in the database, and the look angles to satellites of interest, the existence of clear LOS to any given satellite can be calculated.

The accuracy of the LOS calculation described above may depend, at least in part, on the quality of the user's position fix. GPS accuracy generally is affected by the number of GPS satellites in view. In relatively open areas, this accuracy may be to within a few meters or better, but may degrade in urban areas, where the ATN generally will be deployed due to satellite blockages in "urban canyons". Therefore, in addition to reporting its position, the radiotelephones may also report metrics conveying the quality of the fix, such as the number of GPS satellites in view. The NCC can translate the reported quality-of-fix information into a corresponding position tolerance, defining a radius of uncertainty around the reported position. Thus, the higher the quality of fix, the smaller this radius of uncertainty. By solving the LOS calculation at all locations within this radius of uncertainty and integrating the results, an overall probability of LOS can be assigned, and the estimated interference contribution can be weighted by this probability. If the radiotelephone cannot provide a fix and reports no satellites in view, this may indicate that the user is completely shielded from the outside, such as being inside a building, and the NCC may assign a very low LOS probability in this case. If a fix cannot be provided but one or two satellites are in view, the NCC can assign an appropriately higher LOS probability based on statistical averages.

According to still other embodiments, a GPS augmentation system (similar to Snaptrack) may be used to assist GPS in dense urban areas. Such a system, if integrated into the ATN architecture, could potentially enable position reporting even inside buildings, thereby increasing position reporting accuracy.

Given potentially thousands of ATN users at any time, the sum of the interference contributions from each user, derived using the geo-location described above, can provide an accurate estimate of total co-frequency interference from the ATN into adjacent satellites. If it is desired or necessary to terminate or reassign calls to reduce the interference, the most likely candidates may be those users transmitting at the highest assigned powers with the highest calculated LOS probability.

Finally, according to still other embodiments, a space-based component may be co-located with a satellite of another system. This co-located space-based component can provide a direct way to measure and monitor the power level of the aggregate ancillary signal reaching the satellite of the other system.

Accordingly, some embodiments of the invention can provide a space-based component that is configured to receive wireless communications from radiotelephones in a satellite footprint over one or more frequencies in a satellite radiotelephone frequency band. An ancillary terrestrial network is configured to receive wireless communications from radiotelephones in the satellite footprint, using frequencies other than the one or more frequencies that are used in a given satellite cell and/or using the same one or more frequencies that are used in the given satellite cell. The space-based component receives at least some of the wireless communications between the radiotelephones and the ancillary terrestrial network as interference. The signals that are received by the space-based component as interference are monitored. If excessive signals are present, the radiation by the radiotelephones and/or the ancillary terrestrial network can be reduced. If excessive signals are not present, the radiation can be increased if so desired, or allowed to remain unchanged. Interference with other satellite systems by the ancillary terrestrial network and/or the radiotelephones that communicate therewith thereby may be reduced or prevented.

Additional Embodiments of Monitoring Terrestrially Reused Satellite Frequencies to Reduce Potential Interference The previous section described many embodiments of systems and methods for monitoring terrestrially reused satellite frequencies that can control the number, geographic distribution and/or power of the radiation by the ancillary terrestrial network and/or the radiotelephones that communicate therewith, to reduce or eliminate potential interference with other satellite radiotelephone systems. Interference within the given satellite radiotelephone system (intra-system interference) also may be reduced by this monitoring, according to some embodiments of the present invention. Additional embodiments of monitoring terrestrially reused satellite frequencies to reduce potential interference now will be described. These embodiments may provide additional embodiments of a monitoring operation, for example as illustrated in Block 1310 of FIG. 13.

In general, some embodiments of the present invention provide a space-based component such as the space-based component 110 of FIG. 1 that is configured to wirelessly communicate with radiotelephones, such as the plurality of first radiotelephones 120*a* of FIG. 1, in a satellite footprint over a satellite radiotelephone frequency band. The satellite footprint is divided into a plurality of satellite cells, for example satellite cells 130-130"" of FIG. 1, in which subsets of the satellite radiotelephone frequency band are spatially reused in a spatial reuse pattern. An ancillary terrestrial network that includes at least one ancillary terrestrial component, such as the ancillary terrestrial component 140 of FIG. 1, is configured to wirelessly communicate with radiotelephones, such as the plurality of second radiotelephones 120b of FIG. 1 in the satellite footprint over at least some of the satellite radiotelephone frequency band, to thereby terrestrially reuse the at least some of the satellite radiotelephone frequency band. It will be understood that the functions of the first and second radiotelephones, to communicate with the space-based component and the ancillary terrestrial component, may be performed in a single radiotelephone at various points in time. Moreover, at least some of the radiotelephones may simultaneously communicate with the space-based component, for example to receive communications, and with the ancillary terrestrial network, for example to transmit communications.

A monitor, which can be part of a gateway 160 of FIG. 1 and/or 1670 of FIG. 16, part of a controller 1680 of FIG. 16, part of any other component of the satellite radiotelephone system and/or a discrete entity, is configured to monitor wireless radiation at the space-based component by the ancillary terrestrial network and/or the radiotelephones in satellite cells that adjoin a predetermined cell, such as the at least one of satellite cells 130'-130"" that adjoin satellite cell 130 and/or in the satellite cell 130 itself, in at least part of the subset of the satellite radiotelephone frequency band that is assigned to the predetermined satellite cell 130 for space-based component communications. A controller, which can be part of the gateway 160, 1670, a separate controller 1680, part of any other component of the satellite radiotelephone system, and/or a discrete entity, is configured to adjust the radiation by the ancillary terrestrial network and/or the radiotelephones in response to the monitor.

Figure 18:
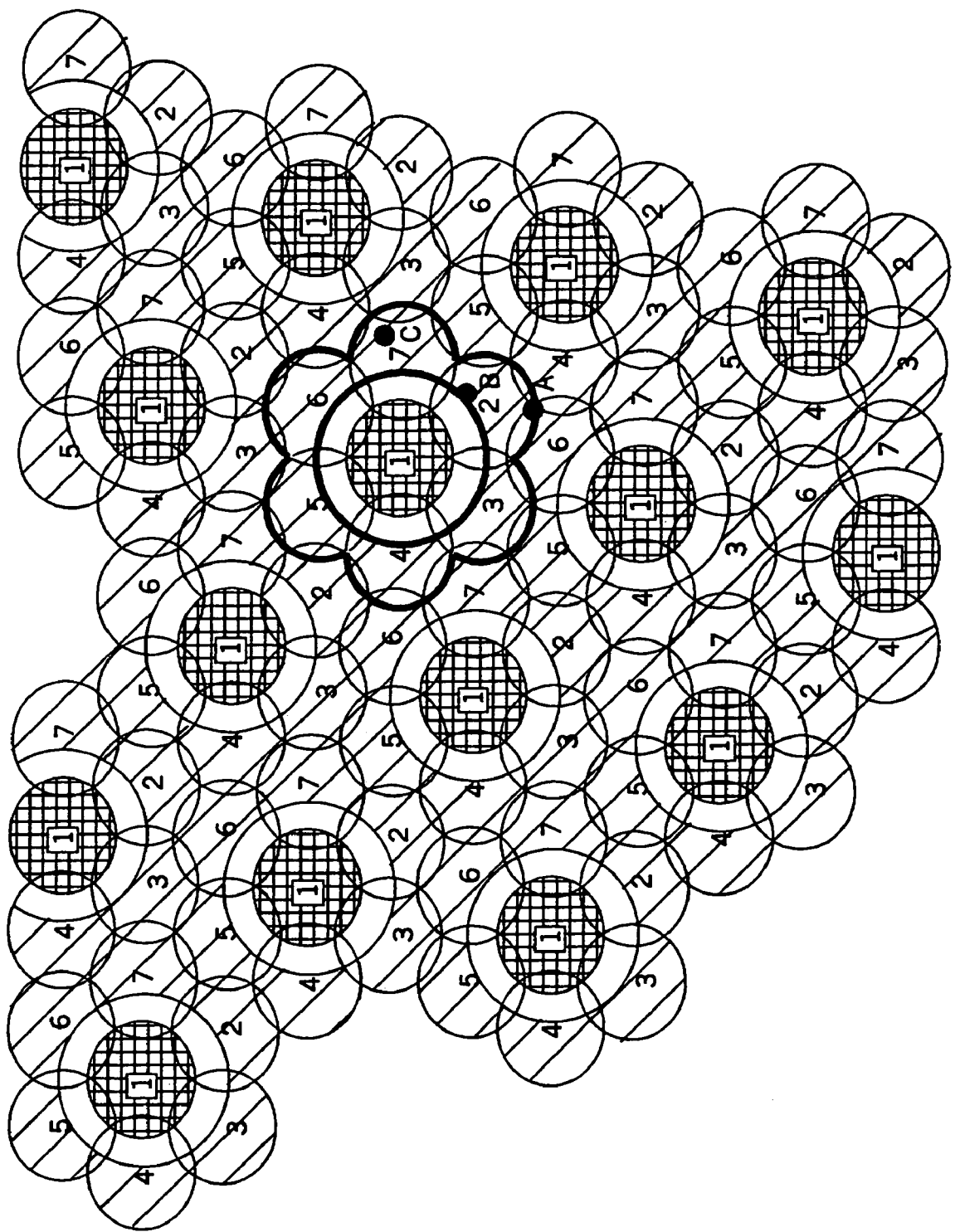
FIG. 18 illustrates a seven-cell satellite frequency reuse pattern and terrestrial reuse of satellite uplink frequencies outside a given satellite cell, according to some embodiments of the present invention.

Some embodiments of the present invention now will be described in connection with FIG. 18. Referring now to FIG. 18, a seven-cell frequency reuse pattern including satellite radiotelephone cells 1-7 is illustrated. In a predetermined satellite cell, such as cell 1, as indicated by the cross-hatched regions of FIG. 18, assume a set of satellite frequencies F1 is assigned. The sets of satellite frequencies F2-F7 that are assigned to satellite cells 2-7 that adjoin the predetermined satellite cell 1, also may be assigned terrestrially, without interference or with substantially low interference, within cell 1. Moreover, as also shown by the hatched area of FIG. 18, the set of frequencies F1 may be reused terrestrially outside satellite cells 1, and separated by satellite cells 1 by a spatial guardband, shown by the unshaded rings surrounding the satellite cells 1. The use of spatial guard bands is described in copending application Ser. No. 10/180,281, filed Jun. 26, 2002, entitled Spatial Guardbands for Terrestrial Reuse of Satellite Frequencies to co-inventor Karabinis, and assigned to the assignee of the present application, the disclosure of which is hereby incorporated herein by reference in its entirety as if set forth fully herein. Accordingly, the provision of spatial guardbands need not be described in further detail herein. Moreover, in other embodiments, spatial guardbands need not be used.

Continuing with the description of FIG. 18, three representative ATCs are shown, labeled A, B and C. Since ATC A is located in an area of overlap between satellite cells 2, 4 and 6, ATC A can terrestrially reuse frequencies from satellite frequency sets F1, F3, F5 and F7, according to some embodiments of the present invention. ATC B is located within satellite cell 2, and in close proximity to satellite cells 5 and 7, so that ATC B can terrestrially reuse frequencies from satellite frequency sets F1, F3, F4 and F6, according to some embodiments of the present invention. Finally, ATC C is in satellite cell 7 and in close proximity to satellite cells 3 and 4. Accordingly, ATC C can terrestrially reuse frequencies from satellite frequency sets F1, F2, F5 and F6, with reduced or no interference with the space-based use of these frequencies. The satellite uplink carrier frame may be arranged as a Time Division Multiple Access (TDMA) frame, such as was described, for example, in FIG. 11, with, for example, eight slots.

As was previously described, monitoring may be performed intra-beam, to reduce or avoid beam discrimination losses. As shown in FIG. 18, the satellite radiotelephone cells that adjoin a given satellite radiotelephone cell, also referred to as "vicinity beams" or "vicinity cells", may be used to monitor the set of frequencies that are used in the given satellite cell, to identify ATC and/or radiotelephone emissions that reach the space-based component. The vicinity beams of a satellite cell 1 are outlined in bold in FIG. 18, and may lie between the related spatial guardband (if any) and the outer boundary of satellite cells 2-7. Thus, for example, the uplink beams of satellite cells 2-7 may be used to monitor the power levels of at least some frequencies in set F1 that are generated by the ATCs and/or radiotelephones in satellite radiotelephone cells 2-7. The detected power levels of uplink frequencies in set F1 over these vicinity beams then may be summed in order to determine the vicinity aggregate noise and interference power. As was already described in FIG. 13, based on this monitoring, the radiation by the ancillary terrestrial network and/or radiotelephones may be increased, reduced or remain the same.

It will be understood that FIG. 18 and the present description illustrates satellite cell 1 as a central cell and satellite cells 2-7 as vicinity cells. However, similar operations may be performed with respect to remaining cells 2-7 as central cells, using their assigned frequency sets F2-F7. These similar operations are not shown in FIG. 18, or described in the present description, for the sake of clarity.

In other embodiments of the present invention, wireless radiation at the space-based component, by the ancillary terrestrial network and/or the radiotelephones in satellite cells that are outside a predetermined satellite cell may be performed. In these embodiments, monitoring takes place not only of radiation from the satellite cells that adjoin the predetermined cell, but also of satellite cells that are a greater distance from the predetermined satellite cell.

It may be desirable to obtain an accurate indication of the terrestrially reused radiation that is generated by the ancillary terrestrial network and/or the radiotelephones that communicate therewith, so that power levels of the ancillary terrestrial network and/or the radiotelephones need not be reduced unnecessarily. Accordingly, it may be desirable to obtain the aggregate noise and interference power of the ancillary terrestrial network and/or the radiotelephones outside satellite radiotelephone cells 1 at one or more satellite uplink frequencies belonging to set F1, without including the contribution of the satellite uplink frequencies of F1 that are used in satellite cells 1 themselves for satellite communications. Stated differently, when satellite radiotelephone cells 2-7 monitor a reused uplink frequency of F1 that is transmitted by the ancillary terrestrial network and/or radiotelephones during terrestrial communications, it may be desirable to exclude from this monitoring the radiation of that uplink frequency of F1 that is used by satellite cells 1 themselves for satellite uplink communications.

Accordingly, in some embodiments of the invention, the vicinity aggregate measurement on a frequency of F1 is taken when that satellite uplink communications frequency of F1 is silent over at least one time slot within satellite radiotelephone cell 1 that is encircled by the vicinity. By taking the vicinity aggregate power measurement of a given frequency outside a given satellite cell while the given satellite cell is silent on the given frequency, a more accurate estimation of the potential interference by ATC and/or radiotelephone reuse of that satellite uplink frequency may be obtained. Stated differently, monitoring may be performed at a time that the at least part of the subset of the satellite radiotelephone frequency band that is assigned to the predetermined satellite cell for space-based components communications is not actually being used in the predetermined satellite cell for space-based component communications.

Many embodiments for silencing satellite radiotelephone communications in a given set of uplink frequencies may be provided according to embodiments of the present invention. In some embodiments, the satellite radiotelephone system may know when these times are occurring, as a result of voice or data inactivity. Stated differently, monitoring takes place at a time that the at least part of the subset of the satellite radiotelephone frequency band that is assigned to the predetermined satellite cell for space-based component communications is not actually being used in the predetermined satellite cell for space-based component communications due to inactivity of at least one radiotelephone in the predetermined satellite cell. In other embodiments, the system can force these non-activity times to occur, for example via Fast Associated Control CHannel (FACCH) signaling, so as to allow the monitoring to take place. In other words, the monitor may include a silencer that is configured to silence the at least part of the satellite radiotelephone frequency band that is assigned to the predetermined satellite cell for space-based component communications. In these embodiments, monitoring may take place at a time that the at least part of the subset of the satellite radiotelephone frequency band that is assigned to the predetermined satellite cell for space-based component communications is silenced by the silencer.

In still other embodiments, it may be desirable to obtain a measurement of the thermal noise floor in which the system is operating, for example the thermal noise floor in the predetermined satellite cell and/or in the satellite cells that adjoin the predetermined satellite cell, to obtain a more accurate measurement of the potentially interfering terrestrially reused frequencies. In order to calibrate the thermal noise floor, other embodiments of the invention may use a silencer to synchronize all vicinity ATCs that reuse an uplink frequency of F1 and periodically command all transmissions to cease at that frequency for a predetermined time interval or intervals.

Thus, in some embodiments, a thermal noise floor in the satellite cells that adjoin the predetermined satellite cell is determined at a time that the ancillary terrestrial network that is in the satellite cells that adjoin the predetermined satellite cell is not communicating with the radiotelephones using the at least part of the subset of the satellite radiotelephone frequency band that is assigned to the predetermined satellite cell for space-based component communications. In still other embodiments, this synchronized cessation of terrestrial reuse of satellite uplink frequencies of F1 may be coordinated with the non-activity of uplink frequencies of F1 within a vicinity's satellite radiotelephone cell 1 and/or within other satellite cells using the satellite uplink frequencies of F1 for satellite communications.

Thus, in other embodiments, the thermal noise floor is determined at a time that the ancillary terrestrial components and/or the radiotelephones that are in the satellite cells that adjoin the predetermined satellite cell are not communicating using the at least part of the subset of the satellite radiotelephone frequency band that is assigned to the predetermined satellite cell for space-based component communications, and the radiotelephones in the predetermined satellite cell also are not communicating with the space-based component using the at least part of the subset of the satellite radiotelephone frequency band that is assigned to the predetermined cell for space-based component communications.

It will be understood by those having skill in the art that the above-described embodiments that silence the satellite uplink frequencies of F1 and/or the terrestrial reuse of the satellite uplink frequencies of F1 for a limited period of time, need not preclude the ability to relay voice and/or data information. For example, in voice mode, the use of a quarter rate GSM vocoder can allow the radiotelephones to transmit once every four TDMA frames, while remaining silent over three frames. Similar principles can be applied to data transmission, with or without some potential sacrifice of data throughput.

In still other embodiments of the present invention, an average satellite antenna pattern discrimination may be used to convert the measured aggregate vicinity ATC interference at a given satellite uplink frequency of F1, to an equivalent thermal noise level increase on the given satellite uplink frequency of F1 for satellite communications. Average antenna discrimination may be obtained by evaluating the antenna discrimination of satellite cell 1 relative to each ATC that is in the vicinity of the satellite cell 1, and is reusing the given satellite uplink frequency of F1, for example by measuring the BCCH of the relevant satellite cell 1 (BCCH 1) at each ATC. In this regard, it will be understood that BCCH 1 bursts corresponding to neighboring cells 1 may be staggered in time to reduce, avoid or minimize interference. The average antenna discrimination then may be obtained by:

$$\text{Average antenna discrimination} = \frac{\alpha_A P_A + \alpha_B P_B + \alpha_C P_C}{P_A + P_B + P_C};$$

where $\alpha$ is the antenna beam discrimination of the relevant vicinity cell 1 at a given ATC of that vicinity, of a specified satellite cell using the given frequency of F1 for ATC communications; and where P is the power due to the given ATC users on the given satellite uplink frequency of F1, detected by the vicinity satellite cell that contains the ATC.

The subscripts A, B and C relate to the ATC that the quantity $\alpha$ or P is associated with. FIG. 18, for example, illustrates 3 ATCs labeled as A, B, C existing within the vicinity of a satellite cell 1.

If a vicinity cell (2-7) contains a plurality of ATCs that are reusing a given frequency of F1, the minimum satellite cell 1 discrimination that is detected, relative to one of the plurality of the ATCs, may be used in the above equation to calculate the average antenna discrimination. This will yield a worst case (minimum) antenna discrimination for the vicinity. This average antenna discrimination may be used to convert the measured aggregate vicinity ATC interference at a frequency of F1 to an equivalent thermal noise level increase on that frequency of F1 for satellite communications.

Other embodiments of the present invention need not use intra-beam measurements in vicinity satellite beams to monitor for potential interference. Rather, a measurement on a satellite uplink frequency of F1 itself may be taken in a satellite radiotelephone cell 1 during a short time period when satellite communications in the satellite cell 1 are silenced. By measuring the power level in a satellite cell 1 of a satellite uplink frequency of F1 at a time when satellite communications using the frequency of F1 are known to be silent, a measurement of potential interference due to terrestrial reuse of the satellite frequency of F1 may be obtained.

Thus, in these embodiments, the monitor is configured to monitor wireless radiation at the space-based component from the predetermined satellite cell, in the at least part of the subset of the satellite radiotelephone frequency band that is assigned to the predetermined satellite cell for space-based component communications, at a time that the at least part of the subset of the satellite radiotelephone frequency band that is assigned to the predetermined satellite cell for space-based component communications is not actually being used in the predetermined satellite cell for space-based component communications. In these embodiments, calibration to the thermal noise floor may be provided using any of the techniques that were described above, for example by silencing the vicinity ATCs that use the frequency of F1. Noise floor calibration also may be made via mathematical analysis. In other embodiments, noise floor calibration also may be performed by using a relatively small sliver of spectrum over which neither ATCs nor SBCs are transmitting.

Other alternate embodiments can reduce the effect of satellite communications using uplink frequencies of F1 on the accuracy of monitoring the effect of terrestrial reuse of satellite uplink frequencies of F1, without the need to silence the satellite communications in cell 1 that use uplink frequencies of F1. In these embodiments, the monitor is configured to determine radiation by the radiotelephones in the predetermined satellite cell, of the at least part of the subset of the satellite radiotelephone frequency band that is assigned to the predetermined satellite cell for space-based component communications, while reducing a contribution of the radiation by the radiotelephones in the predetermined satellite cell of the at least part of the subset of the satellite radiotelephone frequency band that is assigned to the predetermined satellite cell for space-based component communications, to the wireless radiation at the space-based component that is monitored by the monitor.

In some of these embodiments, each radiotelephone that is using a frequency of F1 for space-based communications can report its position to the system. Based on this position information and the known pattern of a satellite cell performing intra-beam ATC monitoring on a frequency of F1, the contribution of that satellite radiotelephone of cell 1 using a frequency of F1 for satellite communications may be determined and at least partially subtracted out, to obtain an accurate assessment of potential interference by terrestrial reuse of satellite frequencies of F1.

Accordingly, the monitor may be further configured to determine radiation by the radiotelephones in the predetermined satellite cell, in the at least part of the subset of the satellite radiotelephone frequency band that is assigned to the predetermined satellite cell for space-based component communications, based on a position of at least one radiotelephone in the predetermined satellite cell. In order to achieve the above, it may be desirable to also obtain the power of the satellite communication carrier of F1 as received by the serving satellite cell. Thus, these embodiments of the present invention need not silence the satellite communication use of satellite uplink frequencies of F1 in satellite cell 1 in order to perform accurate monitoring but, rather, can determine the contribution of the satellite communication of satellite uplink frequencies of F1 based on the position of at least one radiotelephone that is using a frequency of F1 for satellite uplink communications. The need to silence the space-based communications for a short period thereby may be avoided, at the potential expense of more complex calculations.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A satellite radiotelephone system comprising:
   a space-based component that is configured to receive wireless communications from radiotelephones over a range of satellite band return link frequencies and to transmit wireless communications to radiotelephones over a range of satellite band forward link frequencies; and
   an ancillary terrestrial component that is configured to transmit wireless communications to radiotelephones using at least one frequency and to receive wireless communications from radiotelephones using the same at least one frequency.

2. A satellite radiotelephone system according to claim 1 wherein the radiotelephones are located where a satellite footprint of the space-based component and a cell of the ancillary terrestrial component overlap.

3. An ancillary terrestrial component for a satellite radiotelephone system that includes a space-based component that is configured to receive wireless communications from radiotelephones over a range of satellite band return link frequencies and to transmit wireless communications to radiotelephones over a range of satellite band forward link frequencies, the ancillary terrestrial component comprising:
   an electronics system that is configured to transmit wireless communications to radiotelephones using at least one frequency and to receive wireless communications from radiotelephones using the same at least one frequency.

4. An ancillary terrestrial component according to claim 3 wherein the radiotelephones are located where a satellite footprint of the space-based component and a cell of the ancillary terrestrial component overlap.

5. A radiotelephone comprising:
   an electronics system that is configured to transmit wireless communications to a space-based component over a range of satellite band return link frequencies and to receive wireless communications from the space-based component over a range of satellite band forward link frequencies;
   the electronics system further configured to transmit wireless communications to an ancillary terrestrial component using at least one frequency and to receive wireless communications from the ancillary terrestrial component using the same at least one frequency.

6. A radiotelephone according to claim 5 wherein the radiotelephone is located where a satellite footprint of the space-based component and a cell of the ancillary terrestrial component overlap.

7. A satellite radiotelephone communication method comprising:
   receiving wireless communications at a space-based component from radiotelephones over a range of satellite band return link frequencies;
   transmitting wireless communications from the space-based component to radiotelephones over a range of satellite band forward link frequencies; and transmitting wireless communications from an ancillary terrestrial component to radiotelephones using at least one frequency and receiving wireless communications at the ancillary terrestrial component from radiotelephones using the same at least one frequency.

8. A method according to claim 7 wherein the radiotelephones are located where a satellite footprint of the space-based component and a cell of the ancillary terrestrial component overlap.

9. An ancillary terrestrial component operating method for a satellite radiotelephone system that includes a space-based component that is configured to receive wireless communications from radiotelephones over a range of satellite band return link frequencies and to transmit wireless communications to radiotelephones over a range of satellite band forward link frequencies, the ancillary terrestrial component operating method comprising:

transmitting wireless communications to radiotelephones using at least one frequency and receiving wireless communications from radiotelephones using the same at least one frequency.

10. A method according to claim 9 wherein the radiotelephones are located where a satellite footprint of the space-based component and a cell of the ancillary terrestrial component overlap.

11. A radiotelephone operating method comprising:

transmitting wireless communications to a space-based component over a range of satellite band return link frequencies;

receiving wireless communications from the space-based component over a range of satellite band forward link frequencies; and transmitting wireless communications to an ancillary terrestrial component using at least one frequency and receiving wireless communications from the ancillary terrestrial component using the same at least one frequency.

12. A radiotelephone according to claim 11 wherein the radiotelephone is located where a satellite footprint of the space-based component and a cell of the ancillary terrestrial component overlap.

* * * * *